(12) United States Patent
Lapra et al.

(10) Patent No.: US 7,820,771 B2
(45) Date of Patent: *Oct. 26, 2010

(54) ELASTOMERIC COMPOSITION REINFORCED WITH A FUNCTIONALIZED POLYVINYLAROMATIC FILLER

(75) Inventors: Arnaud Lapra, Saint-Saturnin (FR); Sylvie Gandon-Pain, Clermont-Ferrand (FR); Franck Varagniat, Ceyrat (FR)

(73) Assignee: Michelin Recherche et Technique S. A., Granges-Paccot (CH)

( * ) Notice: Subject to any disclaimer, the term of this patent is extended or adjusted under 35 U.S.C. 154(b) by 594 days.

This patent is subject to a terminal disclaimer.

(21) Appl. No.: 11/794,451

(22) PCT Filed: Dec. 30, 2005

(86) PCT No.: PCT/EP2005/014135

§ 371 (c)(1), (2), (4) Date: Jun. 29, 2007

(87) PCT Pub. No.: WO2006/069793

PCT Pub. Date: Jul. 6, 2006

(65) Prior Publication Data

US 2008/0132644 A1 Jun. 5, 2008

(30) Foreign Application Priority Data

Dec. 31, 2004 (FR) .................. 04 14126

(51) Int. Cl.
C08F 283/12 (2006.01)
C08L 27/10 (2006.01)
C08L 25/00 (2006.01)
C08L 21/00 (2006.01)
B60C 1/00 (2006.01)

(52) U.S. Cl. ............... 525/479; 525/191; 525/209; 525/232; 525/241; 526/279; 526/909

(58) Field of Classification Search .......... 525/100, 525/105, 191, 222, 223, 241, 479, 185, 190, 525/209, 279, 329.7, 326.2, 326.5, 328.2, 525/328.9, 451, 330.3; 526/279, 909

See application file for complete search history.

(56) References Cited

U.S. PATENT DOCUMENTS

| 4,791,171 A | 12/1988 | Cunningham |
| 6,133,364 A | 10/2000 | Obrecht et al. |
| 6,207,757 B1 | 3/2001 | Obrecht et al. |
| 6,242,534 B1 | 6/2001 | Obrecht et al. |
| 2002/0052434 A1 | 5/2002 | Lichtenhan et al. |
| 2003/0100652 A1 | 5/2003 | Kim et al. |
| 2004/0116587 A1 | 6/2004 | Thielen et al. |
| 2005/0080197 A1 | 4/2005 | Jana et al. |

FOREIGN PATENT DOCUMENTS

| DE | 19834802 A | 2/2000 |
| DE | 19834803 A | 2/2000 |
| DE | 19834804 A | 2/2000 |
| EP | 1400560 A | 3/2004 |
| FR | 2384817 A | 10/1978 |
| WO | WO 01/72885 A | 10/2001 |
| WO | WO 03/004538 A | 1/2003 |

*Primary Examiner*—Irina S Zemel
*Assistant Examiner*—Jeffrey Lenihan
(74) *Attorney, Agent, or Firm*—Buchanan Ingersoll & Rooney, P.C.

(57) ABSTRACT

Rubber composition based on at least one diene elastomer, a polymeric filler as reinforcing filler and a coupling agent for bonding between the polymeric filler and the elastomer. The polymeric filler includes nanoparticles of a polyvinylaromatic (PVAr) carrying a functional group denoted by Z of formula a ≡Si—X, X representing a hydroxyl or hydrolyzable group. The PVAr is especially a copolymer of styrene, ethylvinylbenzene, divinylbenzene and trimethoxysilylpropylacrylate or trimethoxysilylpropylmethacrylate, being in the form of nanobeads, the diameter of which is between 10 and 100 nm. Also described is a method of obtaining such a composition, and use of such a rubber composition for the manufacture of rubber articles, in particular tires or rubber semi-finished products intended for these tires, as well as a masterbatch including at least one diene elastomer and such a polymeric filler, and a method of obtaining such a masterbatch.

59 Claims, 3 Drawing Sheets

ELASTOMERIC COMPOSITION REINFORCED WITH A FUNCTIONALIZED POLYVINYLAROMATIC FILLER

CROSS REFERENCE TO PRIORITY APPLICATIONS

This application is the United States national phase of International Application No. PCT/EP2005/014135, filed Dec. 30, 2005, published in French as International Publication No. WO 2006/069793 A1 on Jul. 6, 2006, and claims priority to French Application No. 04/14126, filed Dec. 31, 2004, each hereby expressly incorporated by reference in its entirety and each assigned to the assignee hereof.

The present invention relates to diene elastomer compositions intended in particular for the manufacture of tires or semi-finished products for tires, for example treads for these tires.

The invention also relates to reinforcing fillers capable of reinforcing such rubber compositions, more particularly to reinforcing fillers of the organic or polymeric type, and also to their use for reinforcing such rubber compositions.

To reduce fuel consumption and the pollution emitted by motor vehicles, considerable effort has been spent by tire designers to obtain tires having a very low running resistance, improved grip on dry, wet or snow-covered surfaces, and good wear resistance. One effective solution to this problem has been found, over the course of the last fifteen years, by developing novel rubber compositions containing fillers of the inorganic but truly reinforcing type, also known by the name of "non-black fillers", most particularly HDS (Highly Dispersible Silica) fillers, which have proved to be capable of replacing in their reinforcing filler function the conventional carbon blacks for tires.

However, these inorganic reinforcing fillers, because of a slightly higher density for an equivalent reinforcing power, have the known drawback of increasing the weight of the compositions and of the rubber articles deriving there from, compared with the use of carbon black. This goes somewhat counter to another more general objective, that of lightening tires and therefore vehicles containing them.

By continuing their research, the Applicants have discovered that certain synthetic organic fillers can be used in these compositions as true reinforcing fillers, that is to say capable of replacing conventional carbon blacks for tires, such as HDS silicas.

These organic synthetic fillers, thanks to having a density about half as great, allow the weight of compositions and that of rubber articles containing them to be very significantly reduced, without compromising the usage properties of the tires.

Consequently, a first subject of the invention is a rubber composition based on at least one diene elastomer, a polymeric filler and a coupling agent for bonding between the polymeric filler and the elastomer, characterized in that said polymeric filler comprises nanoparticles of a polyvinylaromatic (hereafter abbreviated to "PVAr") carrying a functional group denoted by "Z", of formula ≡Si—X, X representing a hydroxyl or hydrolyzable group.

The subject of the invention is also a masterbatch based on at least one diene elastomer and a polymeric filler comprising the above Z-functionalized PVAr nanoparticles.

The subject of the invention is also a process for obtaining a masterbatch comprising the following steps:
 a diene elastomer latex and a functionalized PVAr latex are initially obtained;
 the lattices are intimately blended;
 the blend thus obtained is precipitated; and
 the precipitate thus obtained is then washed and dried.

this process being characterized in that said polymeric filler comprises nanoparticles of the above Z-functionalized PVAr.

The subject of the invention is also the use of a masterbatch according to the invention for the production of a diene elastomer composition.

The subject of the invention is also a process for obtaining a rubber composition, in which at least one polymeric filler and a coupling agent for bonding between said filler and the elastomer are incorporated into at least one diene elastomer, and in that these are all thermomechanically mixed, in one or more steps, until a maximum temperature between 110° C. and 190° C. is reached, this process being characterized in that said polymeric filler comprises Z-functionalized PVAr nanoparticles. Preferably, to make it easier to incorporate them into the composition of the invention, the PVAr nanoparticles are incorporated into the composition in the form of the masterbatch of the invention.

Another subject of the invention is the use of a composition according to the invention for the manufacture of finished rubber articles or semi-finished rubber products, and also these finished articles and semi-finished products themselves, comprising a rubber composition according to the invention, these articles or products being especially intended for any ground-contact system for motor vehicles, such as tires, internal safety supports for tires, wheels, rubber springs, elastomeric joints, and other suspension and antivibration elements.

The subject of the invention is most particularly the use of a rubber composition according to the invention for the manufacture of tires or semi-finished products for tires, chosen especially from the group consisting of the following: treads; underlayers, for example intended to be placed beneath treads; crown reinforcement plies; sidewalls; carcass reinforcement plies; beads; protectors; inner tubes; impermeable internal rubber compounds for tubeless tires; internal rubber compounds for reinforcing sidewalls; and other rubber compounds intended for supporting the load in the case of running with flat tires.

The composition according to the invention is particularly suitable for the manufacture of tires intended for fitting on passenger vehicles, pick-up trucks, 4-by-4 (4-wheel drive) vehicles, SUVs (Sport Utility Vehicles), two-wheel vehicles, heavy-goods vehicles (that is to say subway, buses, heavy road transport vehicles (trucks, tractors, trailers), or off-road vehicles); planes; civil engineering and agricultural vehicles; or handling vehicles.

The invention and its advantages will be readily understood in the light of the description and exemplary embodiments that follow, and also from the figures relating to these embodiments, which represent:
 a TEM (transmission electron microscope) micrograph of a PVAr filler specimen in aqueous emulsion (FIG. 1);
 a TEM micrograph of a specimen of a rubber composition according to the invention, reinforced by this PVAr filler (FIG. 2); and
 curves showing the variation of the modulus as a function of the elongation for various rubber compositions according to and not according to the invention (FIG. 3 to FIG. 5).

I. MEASUREMENTS AND TESTS USED

I-1. Characterization of the PVAr Polymeric Filler

The PVAr polymeric filler described above consists of nanoparticles, that is to say particles whose main dimension (diameter or length) is typically less than 1 micron and generally lies within the range of the order of about ten nanometers to a hundred or several hundred nanometers.

These nanoparticles are in the form of elementary particles (or "primary particles"), these elementary particles or nanoparticles possibly forming aggregates (or "secondary particles") of at least two of these nanoparticles, it being possible, optionally, for the nanoparticles and/or aggregates to form in turn agglomerates that can be broken up into these nanoparticles and/or aggregates under the effect of an external force, for example under the action of mechanical work.

This polymeric filler is characterized by transmission electron microscopy (TEM), as indicated below.

A) Characterization in Emulsion (Latex):

The PVAr filler latex, prediluted with water (for example 8 g of filler per liter of water) is diluted about 50 times in isopropanol. 40 ml of the solution thus obtained are poured into a tall beaker (50 ml volume) and then dispersed using a 600 W ultrasonic probe (Vibracells probe, reference 72412, sold by Bioblock Scientific), under a power of 100% for 8 minutes in pulsed mode (1 s on/1 s off). A drop of the solution thus obtained is then deposited on a copper microscope grid with a carbon membrane and then observed under a TEM (CM 200 sold by FEI; 200 kV accelerating voltage) equipped with a camera (MegaView II camera sold by Soft Imaging System) and with an image analysis system (AnalySIS Pro A, version 3.0 from Soft Imaging System).

The TEM adjustment conditions are optimized in a known manner according to the specimen and the state of aging of the filament (typically, condenser diaphragm 2 (50 µm in diameter) and objective 3 (40 µm in diameter)). The magnification of the microscope is adapted so as to have sufficient resolution on the nanoparticles. For example, a magnification of 65000 corresponds to a resolution of about 0.96 nm/pixel on the digital image consisting of 1248×1024 pixels. Such a resolution makes it possible for example to define a 40 nm-diameter spherical nanoparticle with more than 1000 pixels. The camera is calibrated conventionally using standards (at low magnification, gold grid consisting of 2160 lines/mm; at high magnification, gold balls 0.235 nm in diameter).

The diameter of the nanoparticles is measured using AnalySIS Pro A version 3.0 software (with the "Cercle" option from the "Mesure" menu). For each image and for a given nanoparticle, the operator defines on the screen (using the mouse) three points located on the periphery of the image of the nanoparticle. The software then automatically plots the circle that passes through these three points and stores, in a file (Excel), the values of the circle area, the circle circumference and the circle diameter of the nanoparticle. As this operation is possible only for nanoparticles having well-defined contours, nanoparticles present in agglomerates are excluded from the measurement. The experiment is repeated at a minimum of 2000 nanoparticles representative of the specimen (obtained from at least 10, typically 50, different images).

B) Characterization in Rubber Composition Form:

The PVAr filler specimens, in vulcanized rubber composition form, are prepared in a known manner by ultracryomicrotomy (see for example L. Sawyer and D. Grubb, *Polymer Microscopy*, page 92, Chapman and Hall).

The apparatus used here is a Leica ultracryomicrotome (EMFCS) equipped with a diamond knife. The specimen is cut in the form of a truncated pyramid of rectangular base, the truncated face from which the sections are produced having sides of less than 600 µm. This truncated pyramid is held firmly during the cutting operation. The specimen is cooled to a suitable temperature (close to the glass transition temperature of the specimen) so that it is hard enough to be able to cut it, the temperature of the knife being typically close to that of the specimen. The speed and the thickness of the cut (as displayed by the apparatus) are preferably comprised between 1 and 2 mm/s and between 20 and 30 nm, respectively. Using a drop of aqueous saccharose solution (40 g in 40 ml of water), the sections are recovered in the chamber of the ultracryomicrotome and then deposited on a TEM grid at room temperature. The saccharose is then eliminated by depositing the grid on the surface of a crystallizer filled with distilled water.

The sections are observed in a CM 200 microscope (200 kV voltage). To optimize the contrast, the observations are made in conventional energy-filtered imaging (ΔE energy window equal to about 15 eV), with a GIF (Gatan Imaging Filter) imaging system and associated software (Filter Control and Digital Micrograph 3.4).

I-2. Characterization of the Rubber Compositions

The rubber compositions are characterized, before and after curing, as indicated below.

A) Tensile Tests

These tests are used to determine the elastic stresses and properties at break after curing. Unless otherwise indicated, they are carried out in accordance with French standard NF T 46-002 of September 1988. The measurements made, at first elongation (i.e. with no accommodation cycle) are the true secant moduli (i.e. calculated with respect to the actual cross section of the test piece), expressed in MPa, at 100% elongation (modulus M100) at 300% elongation (modulus, M300), at 400% elongation (modulus M400) and even 600% elongation (M600 modulus).

Also measured are the tensile strengths (in MPa) and the elongations at break (in %). All these tensile measurements are carried out under standard temperature and moisture conditions (23±2° C.; 50±5% relative humidity).

Processing of the tensile recordings also allows the curve of modulus as a function of elongation to be plotted (see appended FIG. 3 to FIG. 5), the modulus used here being the true secant modulus measured at first elongation.

B) Rheometry:

The measurements are made at 150° C. with an oscillating-chamber rheometer according to the DIN 53529-part 3 (June 1983) standard. The variation of the rheometric torque as a function of time describes the variation of the stiffness of the composition as a result of the vulcanization reaction. The measurements are processed according to the DIN 53529-part 2 (March 1983) standard. $T_i$ (in minutes) is the induction time, that is to say the time needed before the onset of the vulcanization reaction. The 1-order rate of conversion constant K (in $min^{-1}$) is also measured, calculated between 30% and 80% conversion. This allows the vulcanization rate to be determined (the higher K, the more rapid the rate).

C) Dynamic Properties:

The dynamic properties ΔG* and tan $δ_{max}$ are measured on a viscoanalyzer (Metravib VA4000), according to the ASTM D 5992-96 standard. The response of a specimen of vulcanized composition (cylindrical test specimen with a thickness of 2 mm and 79 mm$^2$ in cross section), subjected to a simple alternating sinusoidal shear stress at a frequency of 10 Hz, under standard temperature conditions (23° C.) according to the ASTM D 1349-99 standard is recorded. A scan with a peak-to-peak strain amplitude ranging from 0.1 to 50% (forward cycle) and then from 50% to 0.1% (return cycle) is carried out. The results exploited are the complex dynamic shear modulus (G*) and the loss factor tan δ. For the return cycle, the maximum value of tan δ observed (tan $δ_{max}$) and the difference in complex modulus (ΔG*) between the 0.1 and 50% strain values (the Payne effect) are indicated.

II. DETAILED DESCRIPTION OF THE INVENTION

The rubber compositions according to the invention are based on at least the following constituents: a (i.e. at least one) diene elastomer, a (at least one) polymeric filler as reinforcement filler and a (at least one) coupling agent for coupling between this polymeric filler and this diene elastomer, said polymeric filler comprising PVAr nanoparticles as described in detail later.

Of course, the expression "based on" is to be understood to mean a composition comprising the mix and/or the reaction product of the various base constituents used, some of these constituents being able to react and/or intended to react together, at least partially, during the various phases of manufacture of the composition, or during its subsequent curing. This definition also applies to the masterbatch of the invention.

In the present description, unless otherwise indicated, all the percentages (%) indicated are % by weight.

II-1. Diene Elastomer

The term "elastomer" or "rubber" (the two terms being synonymous) of the "diene" type is understood in general to mean an elastomer resulting at least partly (i.e. a homopolymer or a copolymer) from diene monomers (monomers carrying two carbon-carbon double bonds, whether conjugated or not).

These diene elastomers may be classified in two categories: "essentially unsaturated" and "essentially saturated". The term "essentially unsaturated" is understood to mean a diene elastomer resulting at least partly from conjugated diene monomers, having a number of diene units or units of diene origin (conjugated dienes) that is greater than 15% (mol %). Thus, diene elastomers such as butyl rubbers or diene/α-olefin copolymers of the EPDM type do not fall within the above definition and may in particular be termed "essentially saturated" diene elastomers (small or very small number of units of diene origin, always less than 15%). Within the "essentially unsaturated" diene elastomer category, the term "highly unsaturated" diene elastomer is understood in particular to mean a diene elastomer having a number of units of diene origin (conjugated dienes) that is greater than 50%.

Having given these definitions, it will be understood more particularly that a diene elastomer that may be used in the compositions according to the invention means:
(a) any homopolymer obtained by polymerizing a conjugated diene monomer having 4 to 12 carbon atoms;
(b) any copolymer obtained by copolymerizing one or more conjugated dienes with one another or with one or more vinylaromatic compounds having 8 to 20 carbon atoms;
(c) a ternary copolymer obtained by copolymerizing ethylene, an α-olefin having 3 to 6 carbon atoms with an unconjugated diene monomer having 6 to 12 carbon atoms, such as for example the elastomers obtained from ethylene, propylene and an unconjugated diene monomer of the aforementioned type, such as in particular 1,4-hexadiene, ethylidene norbornene and dicyclopentadiene; and
(d) a copolymer of isobutene and isoprene (butyl rubber), and also the halogenated versions, in particular chlorinated or brominated, versions of this type of copolymer.

Although the present invention applies to any type of diene elastomer, a person skilled in the art of tires will understand that it is preferably employed with essentially unsaturated diene elastomers, in particular of the (a) or (b) type above.

Suitable conjugated dienes are in particular: 1,3-butadiene, 2-methyl-1,3-butadiene, 2,3-di($C_1$-$C_5$ alkyl)-1,3-butadienes, such as for example 2,3-dimethyl-1,3-butadiene, 2,3-diethyl-1,3-butadiene, 2-methyl-3-ethyl-1,3-butadiene, 2-methyl-3-isopropyl-1,3-butadiene; a 1,3-arylbutadiene, 1,3-pentadiene; and 2,4-hexadiene. Suitable vinylaromatic compounds are, for example: styrene, ortho-, meta- and para-methylstyrene, and the commercial "vinyl-toluene" mixture, para-tert-butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinylaromatic units. The elastomers may have any microstructure, which depends on the polymerization conditions used, in particular the presence or absence of a modifying and/or randomizing agent, and on the amounts of modifying and/or randomizing agent employed. The elastomers may for example be block, random, sequence or microsequence elastomers and may be prepared in dispersion (especially emulsion) or in solution. They may be coupled and/or star-configured or else functionalized with a coupling and/or star-configuring or functionalizing agent.

Suitable polymers are polybutadienes, and in particular those having a content of -1,2 units between 4% and 80% and those having a content of cis-1,4 units greater than 80%, polyisoprenes, butadiene-styrene copolymers and in particular those having a styrene content between 5% and 50%, more particularly between 20% and 40%, by weight, a -1,2 bond content of the butadiene part between 4% and 65% and a trans-1,4 bond content between 20% and 80%; butadiene-isoprene copolymers and especially those having an isoprene content between 5% and 90% by weight and a glass transition temperature ($T_g$, measured according to the ASTM D3418) ranging from –40° C. to –80° C.; isoprene-styrene copolymers, and especially those having a styrene content between 5% and 50% by weight and a $T_g$ between –25° C. et –50° C. In the case of butadiene-styrene-isoprene copolymers, particularly suitable are those having a styrene content between 5% and 50%, more particularly between 10% and 40%, by weight, an isoprene content between 15% and 60%, and more particularly between 20% and 50%, by weight, a butadiene content between 5% and 50%, and more particularly between 20% and 40%, by weight, a content of -1,2 units of the butadiene part between 4% and 85%, a content of trans-1,4 units of the butadiene part between 6% and 80%, a content of -1,2 plus -3,4 units of the isoprene part between 5% and 70% and a content of trans-1,4 units of the isoprene part between 10% and 50% and more generally any butadiene-styrene-isoprene copolymer having a $T_g$ between –20° C. and –70° C.

To summarize, the diene elastomer of the composition according to the invention is preferably chosen from the group of highly unsaturated diene elastomers formed by polybutadienes (abbreviated as BR), polyisoprenes (IR), natural rubber (NR), butadiene copolymers, isoprene copolymers and blends of these elastomers. Such copolymers are preferably chosen from the group formed by butadiene-styrene (SBR) copolymers, isoprene-butadiene (BIR) copolymers, isoprene-styrene (SIR) copolymers and isoprene-butadiene-styrene (SBIR) copolymers.

According to one particular embodiment, the diene elastomer is predominantly (that is to say for more than 50 phr) an SBR, whether an SBR prepared in emulsion (E-SBR) or an SBR prepared in solution (S-SBR), or an SBR/BR, SBR/NR (or SBR/IR) or BR/NR (or BR/IR) cut (blend).

According to another particular embodiment, the diene elastomer is predominantly (for more than 50 phr) an isoprene elastomer. This is in particular the case where the compositions of the invention are intended to form, in tires, the rubber matrixes for certain treads (for example for industrial vehicles), crown reinforcement plies (for example working plies, protection plies or hooping-reinforcing plies), carcass reinforcement plies, sidewalls, beads, protectors, underlayers, rubber blocks and other internal rubber compounds providing the interface between the aforementioned regions of the tires.

The term "isoprene elastomer" is understood to mean, as is known, either an isoprene homopolymer or an isoprene copolymer, in other words a diene elastomer chosen from the group consisting of natural rubber (NR), synthetic polyisoprenes (IR), various isoprene copolymers and blends of these elastomers. Among isoprene copolymers, mention may in particular be made of isobutene-isoprene (butyl rubber-IIR) copolymers, isoprene-styrene (SIR) copolymers, isoprene-butadiene (BIR) copolymers and isoprene-butadiene-styrene (SBIR) copolymers. This isoprene elastomer is preferably natural rubber or a synthetic cis-1,4 polyisoprene. Among these synthetic polyisoprenes, it is preferred to use polyisoprenes having a content (mol %) of cis-1,4 bonds greater than 90%, more preferably still greater than 98%.

According to another particular embodiment, especially when it is intended for a tire sidewall or a airtight internal rubber compound for a tubeless tire (or other airtight component), the composition according to the invention may contain at least one essentially saturated diene elastomer, in particular at least one EPDM copolymer or butyl rubber (possible chlorinated or brominated), whether these copolymers are used by themselves or blended with highly unsaturated diene elastomers, such as those mentioned above, especially NR or IR or BR or SBR.

The compositions of the invention may contain a single diene elastomer or a blend of several diene elastomers, it being possible for the diene elastomer or elastomers to be used in combination with any type of synthetic elastomer other than a diene elastomer, or even with polymers other than elastomers, for example thermoplastic polymers.

II-2. PVAr Polymer Filler

The reinforcing polymeric filler of the compositions of the invention has the essential characteristic of comprising nanoparticles of a functionalized polyvinylaromatic (PVAr) carrying one (at least one) functional group denoted by "Z" of formula (I):

Si—X, in which Si represents a silicon atom and X represents a hydroxyl group or a hydrolyzable monovalent group.

A person skilled in the art will readily understand on examining this formula (I) that there exists at least one and at most three hydroxyl or hydrolyzable monovalent groups X connected to the PVAr via the tetravalent silicon atom.

The term "polyvinylaromatic" (abbreviated to PVAr) is understood in the present invention to mean, by definition:
- any homopolymer of a vinylaromatic compound (i.e. by definition any vinyl monomer substituted in the α-position with an aromatic group); or
- any copolymer, at least a predominant fraction of which (preferably at least 50% or higher, and more preferably 70% or higher) comprises vinylaromatic groups, it being possible for the minor fraction (preferably less than 50%, more preferably less than 30%) to derive from one or more monomers of another nature.

Particularly suitable as vinylaromatic compounds are: any styrene compound (by definition any monomer containing the styrl radical) such as for example styrene, 2-methylstyrene, 3-methylstyrene, 4-methylstyrene, α-methylstyrene, 2,4-dimethylstyrene, 2,4-diisopropylstyrene, 4-tert-butylstyrene, methoxystyrene, tert-butoxystyrene, chlorostyrene and chloromethylstyrene. As other preferred examples of styrene compounds, ethylvinylbenzene (hereafter abbreviated to EVB), divinylbenzene (DVB) and their various isomers may be mentioned.

Preferably, in formula (I) below, X is a halogen, especially chlorine, or X satisfies the formula OR in which O is oxygen and R represents hydrogen or a monovalent, linear or branched, hydrocarbon group preferably containing 1 to 15 carbon atoms.

Particularly suitable are Z functional groups chosen from functional groups called "hydroxysilyl" (≡Si—OH) or "alkoxysilyl" (—Si—OR'), R' being a hydrocarbon radical preferably containing 1 to 15 carbon atoms, more preferably chosen from alkyls, alkoxyalkyls, cycloalkyls and aryls, in particular from $C_1$-$C_8$ alkyls, $C_2$-$C_8$ alkoxyalkyls, $C_5$-$C_{10}$ cycloalkyls and $C_6$-$C_{12}$ aryls.

According to a preferred embodiment of the invention, Z satisfies one of the following formulae:

in which:
- the radicals $R^1$, which are substituted or unsubstituted, identical or different, are chosen from the group consisting of $C_1$-$C_8$ alkyls, $C_5$-$C_8$ cycloalkyls and $C_6$-$C_{12}$ aryls; and
- the radicals $R^2$, which are substituted or unsubstituted, identical or different, are chosen from the group consisting of hydroxyl, $C_1$-$C_8$ alkoxyls and $C_5$-$C_8$ cycloalkoxyls.

More preferably, in these formulae:
- the radicals $R^1$ are chosen from the group consisting of $C_1$-$C_4$ alkyls, cyclohexyl and phenyl, especially $C_1$-$C_4$ alkyls and more particularly methyl and ethyl; and
- the radicals $R^2$ are chosen from the group consisting of hydroxyl and $C_1$-$C_6$ alkoxyls, especially from hydroxyl and $C_1$-$C_4$ alkoxyls and more particularly from hydroxyl, methoxyl and ethoxyl.

Even more preferably, one of the radicals $R^1$ are chosen from methyl and ethyl and the radicals $R^2$ are chosen from hydroxyl, methoxyl and ethoxyl.

Preferably, the PVAr is a styrene homopolymer, especially a polystyrene, or a copolymer deriving from styrene units with a predominant weight fraction (preferably at least 50% or higher, more preferably 70% or higher), for example a styrene homopolymer, a styrene-DVB copolymer or a styrene-EVB copolymer or an EVB-DVB copolymer or a styrene-EVB-DVB copolymer, it being possible for the minor fraction (preferably less than 50%, more preferably less than 30%) of said copolymer to furthermore include another comonomer.

For clarity of the presentation, the reader is reminded below of the formulae for the styrene compounds EVB and DVB, and their comparison with styrene:

"EVB" (ethylvinylbenzene)    "DVB" (divinylbenzene)

styrene

The functionalization of the PVAr could be carried out on the final polymer, for example by reaction on its residual double bonds.

Preferably, this functionalization is provided by at least one initial comonomer carrying the function Z. In other words, the PVAr is a copolymer, on the one hand, of at least a first vinylaromatic comonomer (comonomer A) and, on the other hand, at least one second, functionalized, comonomer carrying the function Z (comonomer B), the molar content of this second comonomer preferably being greater than 5%, especially between 5 and 30% and in particular between 5 and 20%.

Comonomer A is preferably a styrene comonomer, more preferably chosen from the group consisting of styrene, EVB, DVB and mixtures of such monomers.

According to a first preferred embodiment, comonomer B is chosen from the group consisting of hydroxysilyl-($C_1$-$C_4$) alkyl acrylates and methacrylates, ($C_1$-$C_4$)alkoxysilyl($C_1$-$C_4$)alkyl acrylates and methacrylates, and mixtures of such monomers. More preferably, it is chosen from the group consisting of hydroxysilyl($C_1$-$C_4$)alkyl, methoxysilyl($C_1$-$C_4$)alkyl and ethoxysilyl($C_1$-$C_4$)alkyl acrylates and methacrylates, and mixtures of such monomers, especially from hydroxysilylpropyl, methoxysilylpropyl and ethoxysilylpropyl acrylates and methacrylates, more particularly from trimethoxysilylpropyl acrylate and trimethoxysilylpropyl methacrylate.

According to a second preferred embodiment, comonomer B is chosen from the group consisting of styryl($C_1$-$C_4$)alkylhydroxysilanes, styryl($C_1$-$C_4$)alkyl($C_1$-$C_4$)alkoxysilanes and mixtures of such monomers. More preferably, it is chosen from the group consisting of styryl($C_1$-$C_4$)alkylhydroxysilane, styryl($C_1$-$C_4$)alkylmethoxysilane and styryl($C_1$-$C_4$) alkylethoxysilane, and mixtures of such monomers, especially styrylethylhydroxysilane, styrylethylmethoxysilane and styrylethoxysilane. More particularly, styrylethyltrimethoxysilane (or trimethoxysilylethylstyrene) is used.

Given the preferred molar contents indicated above for this comonomer B carrying the functional group Z, said comonomer is used with a weight content that is preferably greater than 10%, more preferably between 10 and 30% and especially between 15 and 30%.

Comonomers of type B are well known, especially those chosen from the group consisting of trimethoxysilylpropyl methacrylate (abbreviated to MTSP), trimethoxysilylpropyl acrylate (ATSP) and trimethoxysilylethylstyrene (TSES) or styrylethyltrimethoxysilane, having respectively formulae:

MTSP (trimethoxysilylpropyl methacrylate)

ATSP (trimethoxysilylpropyl acrylate)

TSES (trimethoxysilylethylstyrene)

According to one particularly preferred embodiment of the invention, the functionalized PVAr is furthermore in a crosslinked state, that is to say in a three-dimensional form, so as to maintain the morphology of the filler at high temperature.

Such crosslinking may be provided by any known means, for example using a post-treatment or, according to a more preferable embodiment, by at least one of the initial comonomers provided that, of course, said comonomer is at least difunctional, that is to say carrying at least a second functional group capable of creating a three-dimensional PVAr network during polymerization.

This crosslinking comonomer (hereinafter called comonomer C) is preferably a comonomer that may be polymerized by an addition reaction. It may be vinylaromatic (identical to or different from comonomer A described above) or nonvinylaromatic.

More preferably suitable as comonomer C are comonomers carrying two unsaturated groups, especially ethylenic groups, which may polymerize by a radical route, in particular those chosen from the group consisting of di(meth)acrylates of polyols, especially of diols or triols (for example ethylene glycol, propylene glycol, 1,4-butanediol, 1,6-hexanediol and trimethylolpropane), alkylene di(meth)acrylamides (for example methylene bis-acrylamide), vinylaromatic compounds, preferably styrene compounds, which carry at least two vinyl groups (for example diisopropenylbenzene (DIB), divinylbenzene (DVB), trivinylbenzene (TVB)), and mixtures of such comonomers.

It is also possible to use as crosslinking comonomer the comonomer carrying the aforementioned functional group Z (comonomer B), provided that, of course, this comonomer B is at least difunctional and copolymerizable, preferably by a radical route, with the other comonomers.

The weight content of crosslinking comonomer is preferably greater than 1%, more preferably greater than 5% and in particular between 10 and 30%, especially if it is a vinylaromatic comonomer, in particular a styrene comonomer.

Various other monomers, such as for example diene monomers such as butadiene, isoprene and piperylene, may optionally be added in a minor amount, preferably less than 20% of the total weight of monomers.

The Z-functionalized PVAr may be prepared by any synthesis method suitable for functionalizing a vinylaromatic homopolymer or copolymer.

Preferably, such a synthesis is carried out by radical polymerization of one (at least one) vinylaromatic first monomer (comonomer A) with one (at least one) second comonomer (vinylaromatic or nonvinylaromatic comonomer B), which is itself polymerizable by a radical route and carrying the aforementioned functional group Z, it being possible for the two comonomers A and B to be advantageously supplemented, as explained above, by one (at least one) third monomer (comonomer C) having a crosslinking function.

The general principle of such a synthesis is well known and has in particular been applied to the radical emulsion polymerization of Z (alkoxysilane or hydroxysilane)-functionalized polystyrene in the presence of MTSP (see for example *Macromolecules* 2001, 34, 5737 and *Macromolecules* 2002, 35, 6185), or to the synthesis of crosslinked (but nonfunctionalized) polystyrene in the presence of DVB (*Polymer* 2000, 41, 481). The polymers described in these publications are intended for applications as varied as paints, inks, magnetic fluids, paper and biotechnology. No mention is made of any application as reinforcing filler, particularly in a diene elastomer matrix for a tire.

Preferably, for the synthesis described above, comonomer A is a styrene monomer chosen from the group consisting of styrene, EVB, DVB and mixtures of these monomers. Functionalizing comonomer B is preferably chosen from the group consisting of MTSP, ATSP, TSES and mixtures of these monomers. Optional crosslinking comonomer C is itself a styrene compound preferably chosen from the group consisting of DIB, DVB, TVB and mixtures of these monomers.

Thus, it is possible to obtain Z-functionalized, especially crosslinked, PVAr nanoparticles in emulsion in water, that is to say in the form of a latex (typically, for example, 100 g of polymer per liter of water). It should be recalled that the term "polymer latex" should be understood in a known manner as a colloid system composed of a suspension or emulsion of polymer particles in an aqueous medium.

Figure 1:
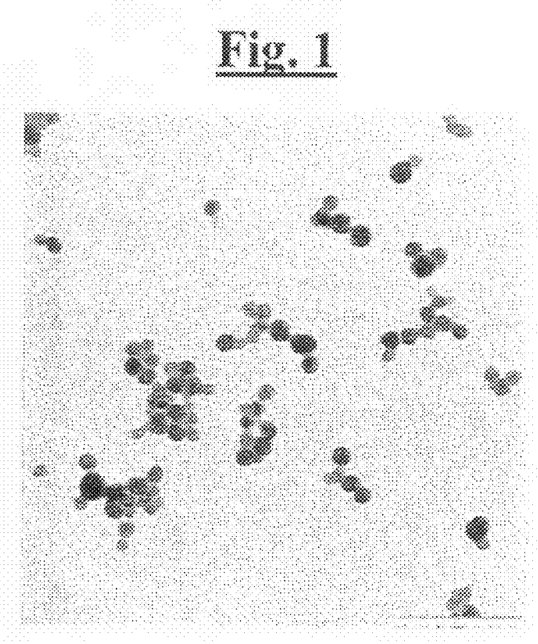

As reproduced in FIG. 1, these PVAr nanoparticles, characterized by TEM as explained in the above section I-1-A, are preferably in the form of elementary particles of substantially spherical shape (and therefore the shape of nanobeads), either in the isolated state or in aggregates, which are themselves possibly agglomerated. The number of nanoparticles per aggregate is typically between 2 and 100. The mean diameter of these nanobeads, which can be measured by TEM as indicated in section I-1-A, is preferably between 10 and 100 nm, more preferably between 10 and 60 nm, and particularly between 10 and 40 nm.

In the rubber composition of the invention, the PVAr filler content is preferably between 10 and 100 phr (the reader is reminded that phr=parts by weight per hundred parts of rubber). Thanks to the low density of the filler, this content is advantageously between 10 and 80 phr, even more preferably between 20 and 50 phr.

Preferably, the PVAr filler furthermore constitutes more than 80%, more preferably more than 90% (% by volume) of the total content of reinforcing filler, it being possible for a minor fraction (preferably less than 20%, more preferably less than 10% by volume) of this total content to consist of another reinforcing filler, for example an inorganic reinforcing filler or carbon black. Advantageously, the entire content of reinforcing filler is made up of the PVAr filler.

The term "inorganic reinforcing filler" is understood here to mean an inorganic or mineral filler whatever its color and its origin (natural or synthetic), also called "white" filler, "clear" filler or even "non-black" filler as opposed to carbon black, this inorganic filler being capable of reinforcing by itself, without a means other than an intermediate coupling agent, a rubber composition intended for the manufacture of tires, in other words capable of replacing, in its reinforcing function, a conventional tire-grade carbon black filler.

As inorganic reinforcing fillers that may be used together with the PVAr filler, mineral fillers of the siliceous type, in particular silica ($SiO_2$), or of the aluminous type, in particular alumina ($Al_2O_3$), are particularly suitable. The silica used may be any reinforcing silica known to those skilled in the art, especially any precipitated or pyrogenic silica having a BET surface area and a CTAB specific surface area that are both less than 450 $m^2/g$, preferably between 30 and 400 $m^2/g$. As examples of precipitated highly dispersible silicas (HDS silicas), mention may for example be made of the silicas Ultrasil 7000 and Ultrasil 7005 from Degussa, the silicas Zeosil 1165 MP, 1135 MP and 1115 MP from Rhodia, the silica Hi-Sil EZ150G from PPG, the silicas Zeopol 8715, 8745 and 8755 from Huber, and the silicas as described in Application WO 03/016387. As examples of reinforcing aluminas, mention may be made of the aluminas "A125" or "CR125" "Baikalox" from Baikowski, "APA-100RDX" from Condea, "Aluminoxid C" from Degussa and "AKP-G015" from Sumitomo Chemicals.

A carbon black may also be associated with the PVAr filler, for example a black of the HAF, ISAF or SAF type, which are conventionally used in tires (for example highly reinforcing blacks N115, N134, N234, N326, N330, N339, N347, N375, or else, depending on the intended applications, blacks of higher series, for example N660, N683, N772).

The amount of carbon black present in the total reinforcing filler may vary widely and is preferably less than that of the PVAr filler. Advantageously, it is possible to use carbon black at a low or very low content, preferably a content less than 10 phr, more preferably less than 6 phr, for example between 0 and 3 phr. The composition benefits in particular from the coloring (black pigmenting agent) and anti-UV properties of carbon blacks within the ranges indicated, without also prejudicing the typical performance characteristics provided by the PVAr polymeric filler.

Preferably, the total reinforcing filler content in the compositions of the invention lies in a range from 20 to 400 phr, more preferably 30 to 200 phr.

II-3. PVAr Filler Masterbatch

According to the best mode known of carrying out the invention, the PVAr nanoparticles described above are incorporated into the rubber composition of the invention by means of a masterbatch, that is to say these particles are precompounded with at least one diene elastomer, in order to make their subsequent incorporation into the final rubber composition easier.

The term "masterbatch" should be understood, as is known, to mean the compounding of at least one elastomer (more generally, a polymer) and a reinforcing filler, as precursor compound of the final elastomer (or polymer) composition, ready for use.

This masterbatch, comprising at least the functionalized PVAr filler as described above and a diene elastomer (or blend of diene elastomers) constitutes another subject of the present invention.

This masterbatch may be prepared by a process that is itself another subject of the invention, comprising the following steps:
- a diene elastomer latex and a functionalized PVAr latex are initially obtained;
- the latices are intimately blended;
- the blend thus obtained is precipitated; and
- the precipitate thus obtained is then washed and dried.

The diene elastomer latex may consist of an elastomer already available as an emulsion (for example an SBR emulsion), or of a diene elastomer initially in solution (for example an SBR solution) which is emulsified in a mixture of an organic solvent and water, generally by means of a surfactant (the organic solvent disappearing at coagulation or precipitation).

The operation of intimately blending the two latices is carried out so as to properly dispose the polymer filler in the diene elastomer and to homogenize the system in order to form a latex blend having a solids concentration preferably between 20 and 500 g/l, more preferably between 50 and 350 g/l. Preferably, the two starting latices are diluted with water before being blended (for example 1 volume of water per 1 volume of latex).

The blend of the two latices may be precipitated by any method known to those skilled in the art, for example by mechanical action or preferably by the action of a coagulant.

The coagulant is any liquid compound that is miscible with water but not a solvent (or is a poor solvent) for the elastomer, for example an aqueous saline solution, preferably an alcohol or a solvent mixture containing at least one alcohol (for example alcohol and water, or alcohol and toluene). More preferably, the coagulant is just an alcohol, such as methanol or isopropanol.

The coagulation is preferably carried out with stirring, at room temperature, in a large volume of coagulant. Typically, substantially the same volume of alcohol as the total volume of the two diluted latices is used. During this step it is preferred to pour the blend of the two lattices onto the coagulant, and not the other way round.

After washing and drying, the masterbatch is obtained in a form called "rubber crumb", comprising at least the chosen diene elastomer (for example NR or SBR) and the PVAr nanoparticles embedded in the elastomer matrix.

Optionally, various additives may be incorporated into the masterbatch, whether these be intended for the masterbatch proper (for example a stabilizer, carbon black as coloring and anti-UV agent, a plasticizer, an antioxidant, etc.) or for the final rubber composition (for example a coupling agent) for which the masterbatch is intended.

The elastomer of the masterbatch may be any diene elastomer, which may or may not be the same as that (or those) of the rubber matrix of the invention. It may be advantageous to use the same diene elastomer and to adjust the PVAr content in the masterbatch to the final content intended for the composition, so as not to have to add diene elastomer subsequently, during the production of the composition of the invention.

II-4. Coupling Agent

Like any inorganic reinforcing filler such as silica, the Z-functionalized PVAr filler requires the use of a coupling agent (also called a bonding agent) in order to establish sufficient connection between the surface of its particles and the diene elastomer, and to ensure that the reinforcing filler completely fulfils its function in the compositions of the invention.

It will be recalled that a coupling agent, at least a difunctional coupling agent, has in particular a simplified general formula Y-T-U, in which:
- Y represents a functional group (functional group Y) capable of bonding physically and/or chemically to the filler;
- U represents a functional group (functional group U) capable of physically and/or chemically bonding to the diene elastomer, for example via a sulfur atom; and
- T represents a divalent group allowing Y to be linked to U.

The coupling agents must in particular not be confused with simple covering agents which, as is known, may include the functional group Y, which is active with respect to the filler, but do not have the functional group U which is active with respect to the elastomer.

Coupling (silica/diene elastomer) agents, of variable effectiveness, have been described in a very large number of documents and are well known to those skilled in the art. It is possible to use any coupling agent that is capable, in the diene rubber compositions that may be used for the manufacture of tires, of ensuring effective bonding between an inorganic reinforcing filler such as silica and a diene elastomer, in particular polyfunctional organosilanes or polyorganosiloxanes bearing the functional groups U and Y.

Polysulfide silanes are used in particular, these being "symmetric" or "asymmetric" depending on their particular structure, as described for example in patent applications WO03/002648 and WO03/002649.

Particularly suitable for carrying out the invention, without the definition given below being limiting, are "symmetric" polysulfide silanes satisfying the following general formula (II):

$$Q\text{-}A\text{-}S_n\text{-}A\text{-}Q, \text{ in which:} \qquad (II)$$

n is an integer from 2 to 8 (preferably from 2 to 5);

A is a divalent hydrocarbon radical (preferably $C_1$-$C_{18}$ alkylene groups or $C_6$-$C_{12}$ arylene groups, more particularly $C_1$-$C_{10}$ alkylene groups, especially $C_1$-$C_4$ alkylene groups, in particular propylene);

Q satisfies one of the following formulae:

in which:
- the radicals $R^3$, which are substituted or unsubstituted, identical or different, represent a $C_1$-$C_{18}$ alkyl, $C_5$-$C_{18}$ cycloalkyl or $C_6$-$C_{18}$ aryl group (preferably $C_1$-$C_6$ alkyl groups, cyclohexyl or phenyl groups, especially $C_1$-$C_4$ alkyl groups, more particularly methyl and/or ethyl);
- the radicals $R^4$, which are substituted or unsubstituted, identical or different, represent a hydroxyl group, a $C_1$-$C_{18}$ alkoxyl or $C_5$-$C_{18}$ cycloalkoxyl group (preferably a group chosen from hydroxyl, $C_1$-$C_8$ alkoxyls and $C_5$-$C_8$ cycloalkoxyls, more preferably still a group chosen from $C_1$-$C_4$ hydroxyl and $C_1$-$C_4$ alkoxyls, in particular from hydroxyl, methoxyl and ethoxyl).

In the case of a mixture of polysulfide silanes satisfying the above formula (II), especially standard commercially available mixtures, the average value of the "n" is preferably a fractional number between 2 and 5, more preferably close to 4. However, the invention may also be advantageously carried out for example with disulfide silanes (n=2).

As examples of polysulfide silanes, mention may more particularly be made of bis(($C_1$-$C_4$)alkoxyl($C_1$-$C_4$)alkylsilyl ($C_1$-$C_4$)alkyl)) polysulfides (especially disulfides, trisulfides and tetrasulfides), such as for example bis(3-trimethoxysilylpropyl or bis(3-triethoxysilylpropyl) polysulfides. Among these compounds, bis(3-triethoxysilylpropyl)tetrasulfide, abbreviated to TESPT, of formula $[(C_2H_5O)_3Si(CH_2)_3S_2]_2$ or bis(triethoxysilylpropyl)disulfide, abbreviated to TESPD, of formula $[(C_2H_5O)_3Si(CH_2)_3S]_2$, is in particular used.

As examples of advantageous coupling agents, mention may also be made of bis(($C_1$-$C_4$)monoalkoxyl($C_1$-$C_4$)dialkylsilylpropyl)polysulfides (especially disulfides, trisulfides and tetrasulfides), more particularly bis(monoethoxydimethylsilylpropyl)tetrasulfide or disulfide, as described in patent application WO 02/083782.

As examples of coupling agents other than the aforementioned polysulfide alkoxysilanes, mention may in particular be made of bifunctional polyorganosiloxanes or else hydroxysilane polysulfides ($R^4$=OH in formula II above) as described in patent applications WO 02/30939 and WO 02/31041.

In the compositions according to the invention, the content of coupling agent is advantageously less than 10 phr, it being understood that it is in general desirable to use as small amount of coupling agent as possible. Its content is preferably less than 7 phr, more preferably less than 5 phr, in particular between 0.5 and 4 phr.

The coupling agent could be pregrafted (via the functional group U) onto the diene elastomer of the composition of the invention, the elastomer thus functionalized or "precoupled" then comprising the free functional group Y in the case of the polymeric filler. The coupling agent could also be pregrafted (via the functional group Y) onto the PVAr filler via its functional group Z, the filler thus "precoupled" then being able to be linked to the diene elastomer via the free functional group U. However, for reasons of better processing of the compositions in the uncured state, it is preferred to use the coupling agent either grafted onto the polymeric filler or in the free state (that is to say ungrafted).

II-5. Various Additives

The rubber compositions according to the invention also comprise some or all of the standard additives conventionally used in elastomer compositions intended for the manufacture of tires, such as for example plasticizers and oil extenders, whether the latter are aromatic or nonaromatic oils, pigments, protective agents, such as antiozone waxes, chemical antiozonants, antioxidants, antifatigue agents, reinforcing or plasticizing resins, methylene acceptors (for example phenolic novolac resin) or methylene donors (for example HMT or H3M), a crosslinking system based either on sulfur, or on sulfur donors and/or peroxides and/or bismaleimides, vulcanization accelerators and vulcanization activators.

Preferably, these compositions include, as preferably non-aromatic or very slightly aromatic plasticizing agent, at least one compound chosen from the group consisting of naphthenic oils, paraffinic oils, MES oils, TDAE oils, glycerol esters (particularly trioleates), hydrocarbon plasticizing resins having a high $T_g$ of preferably greater than 30° C., and mixtures of such compounds. The overall content of such a preferential plasticizing agent is preferably between 10 and 50 phr, more preferably between 20 and 40 phr.

Among these hydrocarbon plasticizing resins (the reader will be reminded that the name "resin" is reserved by definition to a solid compound), mention may in particular be made of homopolymers or copolymers of α-pinene, β-pinene, dipentene or polylimonene, C5 cut, for example a C5 cut/ styrene copolymer, used by themselves or in combination with plasticizing oils such as MES or TDAE oils.

It is also possible to add to the reinforcing filler described above (i.e. the PVAr polymeric filler plus carbon black and/or inorganic filler such as HDS silica, where appropriate), depending on the intended application, inert (non-reinforcing) fillers such as clay, bentonite, talc, chalk and kaolin particles, which can for example be used in colored tire sidewalls or treads.

These compositions may also contain, in addition to the coupling agents, coupling activators or covering agents (comprising for example just the functional group Y) for the inorganic reinforcing filler, or more generally processing aids that are capable, as is known, thanks to the improvement in dispersion of the inorganic filler in the rubber matrix and to a lowering of the viscosity of the compositions, to improve their processability in the uncured state, these agents being for example hydrolyzable silanes, such as alkylalkoxysilanes (especially alkyltriethoxysilanes), polyols, polyethers (for example polyethylene glycols), primary, secondary or tertiary amines (for example trialkanolamines), hydroxylated or hydrolyzable polyorganosiloxanes, for example α,ω-dihydroxypolyorganosiloxanes (especially α,ω-dihydroxypolydimethylsiloxanes).

II-6. Preparation of the Rubber Compositions

The compositions of the invention are produced in appropriate mixers, using for example two successive preparation steps according to a general procedure well known to those skilled in the art, namely a first step thermomechanically working or kneading (referred to as "non-productive" step) at high temperature, up to a predetermined maximum temperature (here between 110° C. and 190° C., preferably between 120° C. and 170° C.), followed by a second mechanical working step (referred to as "productive" step) at lower temperature, typically below 120° C., for example between 60° C. and 100° C., during which finishing step the crosslinking or vulcanization system is incorporated.

According to the best method of implementation known, the PVAr nanoparticles are incorporated into the composition of the invention in the form of the masterbatch described above.

As an example, all the constituents of the compositions of the invention, with the exception of the vulcanization system, in particular the PVAr filler in its masterbatch and its coupling agent, are intimately incorporated, by kneading, into the diene elastomer (or blend of diene elastomers) of the composition during the "non-productive" first step, that is to say these various base constituents are introduced into the mixer and thermomechanically mixed, in one or more steps, until the predefined maximum temperature is reached. The total mixing time in this "non-productive" step is preferably between 1 and 15 minutes.

After cooling the compound obtained in this way during the "non-productive" first step, the vulcanization system is then incorporated at low temperature, generally in an external mixer such as a two-roll mill. All the ingredients are then mixed (productive step) for a few minutes, for example between 2 and 15 minutes.

The vulcanization system proper is preferably based on sulfur and an accelerator. It is possible to use any compound that can act as a vulcanization accelerator for diene elastomers in the presence of sulfur, in particular those chosen from the group consisting of 2-mercaptobenzothiazyl disulfide (abbreviated to MBTS), N-cyclohexyl-2-benzothiazyl sulfenamide (abbreviated to CBS), N,N-dicyclohexyl-2-benzothiazyl sulfenamide (abbreviated to DCBS), N-tert-butyl-2-benzothiazyl sulfenamide (abbreviated to TBBS), N-tert-butyl-2-benzothiazyl sulfenimide (abbreviated to TBSI) and mixtures of these compounds. Preferably, a primary accelerator of the sulfenamide type is used.

Various known secondary accelerators or vulcanization activators may be added to this vulcanization system, these being incorporated during the "non-productive" first step and/or during the productive step, such as zinc oxide, fatty acids like stearic acid, guanidine derivatives (in particular, diphenylguanidine), etc. The sulfur content is preferably between 0.5 and 3.0 phr while that of the primary accelerator is preferably between 0.5 and 5.0 phr.

The final composition thus obtained is then calendared, for example in the form of a film or a sheet, especially for laboratory characterization, or else extruded in the form of a rubber strip that may be used for example as a tire tread for a passenger vehicle.

The vulcanization (or curing) is carried out in a known manner at a temperature generally between 130° C. and 200° C., for a sufficient time, which may for example vary between 5 and 90 minutes, depending in particular on the curing temperature, on the vulcanization system adopted and on the rate of vulcanization of the composition in question.

III. EXEMPLARY EMBODIMENTS

III-1. Test 1

In the following exemplary embodiments, the PVAr filler, Z-functionalized and crosslinked, was synthesized by a radical polymerization of four different monomers, namely styrene, EVB, DVB and MTSP, and then incorporated into the rubber composition of the invention in the form of a masterbatch obtained by coprecipitating a latex of the PVAr filler and a latex of a diene elastomer (SBR).

According to one particularly preferred embodiment, the weight content of monomer carrying the functional group Z, (here, MTSP) was between 20 and 30%, that of the crosslinking monomer (here, DVB) was between 10% and 30% and the total weight fraction of styrenic units (i.e., in the present case, EVB and DVB) was greater than 70%.

III-1-A. Synthesis of the PVAr Filler

The radical emulsion polymerization was carried out in a medium buffered to a pH of 7, with simultaneous introduction, into a reactor, of the styrene, the MTSP (Aldrich product), and a DVB/EVB blend (a DVB product from Fluka containing in fact 50% DVB and 50% isomers of EVB), said blend being washed beforehand three times with an aqueous 1M sodium hydroxide solution (3×165 ml per 200 ml of DVB/EVB blend) and then washed with water until a neutral pH was reached.

The various monomers were subjected beforehand to nitrogen sparging, as were the aqueous solutions used, with the exception of the SDS solution (sparging in the powder state). The reaction was carried out in a 1.5-liter reactor fitted with mechanical stirring and a condenser. After introducing 845 ml of water and sparging with nitrogen for 30 minutes with stirring, 50 ml of an aqueous 0.9 mol/l sodium dodecylsulfate (SDS) solution, as surfactant, and 50 ml of an equimolar 1 mol/l buffer solution of sodium hydrogen phosphate and ammonium dihydrogen phosphate were introduced in succession. Added to this solution buffered to pH 7, and slowly stirred at 150 rpm and heated at 60° C., was the monomer charge composed of 36.4 g of styrene (i.e. a weight fraction of 37%), 24.8 g of MTSP (weight fraction of 25%), 18.7 g of DVB (weight fraction of 19%) and 18.7 g of EVB (weight fraction of 19%), (giving a total of 98.6 g of monomers).

Then added to the resulting emulsion, with vigorous stirring (350 rpm), were 36 ml of an aqueous (0.125 mol/l) potassium persulfate solution. After stirring for 2 h 45 min at 60° C., 18 ml of an aqueous (0.5 mol/l) hydroquinone solution were added to the polymerization medium. The reaction medium was cooled before being mixed with the elastomer (conversion, measured as solids content, was 95%).

The functionalized and crosslinked PVAr filler thus obtained was in the form of a latex comprising about 10% by weight of polymer, the balance (about 90%) consisting of water.

The filler latex was characterized as indicated in section I-1-A. The TEM micrograph in FIG. 1 shows that the nanoparticles (elementary particles) are in the form of nanobeads having predominantly a diameter between 20 and 60 nm. The average circular diameter was 30 nm (with a standard deviation of 6 nm).

At this stage, the PVAr filler was isolated and dried for determining its degree of functionalization (with Z) provided by the MTSP monomer, by assaying the silicon content, the procedure being as follows:

a first step of dissolving the specimen in an aqueous medium by calcination and then by alkaline fusion of the ash obtained;

a second step quantitatively assaying the silicon by inductively coupled plasma atomic emission spectroscopy (ICP/AES).

More precisely, the procedure was the following: the specimen was calcined at 525° C. for 2 hours. The fusion operation was then performed on the ash obtained, at 1150° C. (+50° C.) with lithium tetraborate (for example 2 g per 1 g of calcined filler), for about 25 minutes. After cooling, the entire fused mass obtained was dissolved at 80° C. in hydrochloric acid diluted to 2% in water. The solution was then transferred and adjusted in a calibrated flask.

The silicon assay was then carried out, on the contents of the calibrated flask, by ICP/AES. The aqueous solution was sent into an argon plasma via an introduction system, where it underwent desolvation, atomization and then excitation/ionization of the atoms present. The silicon emission line at 251.611 nm was then selected by means of a monochromator and then quantified by comparison with a calibration curve prepared from a certified standard solution of the corresponding element (the intensity I of the emitted line being proportional to the concentration C of the corresponding element).

The result was expressed as mass % of silicon relative to the dry specimen (predried at 105° C. for 2 hours) according to the formula:

$$\% \mathrm{Si} = C \times V \times (100/M)$$

in which:

C=Si concentration expressed in mg/l;

V=volume of the calibrated flask in l;

M=mass of the specimen in mg.

The measured value was compared with that of a poly (styrene-DVB-EVB) control synthesized in the identical manner, but without MTSP.

The results below clearly demonstrate that the silicon present in the PVAr filler is clearly due to the functionalization of the PVAr provided by the MTSP monomer:

| Si content (±0.2%) | without MTSP | with MTSP |
|---|---|---|
| Assayed (%) | not detected | 2.9% |

The resulting powder was also analyzed by $^{29}$Si NMR in CPMAS mode (200 MHz AV spectrometer; 4 kHz rotation speed). The analysis revealed a predominant feature between −41 ppm and −38 ppm, characteristic of silicon of the Si—X type, as described above.

The density of the filler was measured on the powder using a helium pycnometer, the value obtained being 1.1 g/cm$^3$.

III-1-B. Preparation of the Masterbatch

The PVAr filler latex was then incorporated directly into an SBR diene elastomer for obtaining a masterbatch, as indicated in section II-3 above. The intended PVAr filler content in the masterbatch, as in the intended final rubber composition, was 39 phr.

The SBR latex was prepared in a known manner to those skilled in the art, under the following conditions: polymerization temperature: 5° C.; surfactant: sodium dodecylsulfate; initiator: iron$^{II}$ salt/hydroperoxide redox system. The conversion was around 50 to 60%. The SBR thus produced had the following characteristics: inherent viscosity at 0.1 g/dl in toluene at 25° C.: 3.11; Mooney viscosity (MS) equal to 67; $T_g$ (DSC)=−52° C.; microstructure: 23.6% styrene, butadiene phase: 15.0% vinyl, 70.1% trans and 14.9% cis.

The solids content of the SBR latex was determined by weighing, on the dry extract, before preparing the masterbatch. The SBR latex was diluted three times with water, i.e. 734 ml of 216.6 g/l SBR latex (159 g of SBR) and 1468 ml of dilution water.

After the PVAr filler latex had been synthesized, it was cooled to room temperature and then added to the SBR latex diluted to an amount corresponding to 39 phr of filler, i.e. 743 ml of 83.4 g/l polymeric filler latex (62 g of filler). The resulting mixture was gently homogenized. The mixture was then added, at a rate of 100 ml/min, to 6000 ml of methanol stirred at 350 rpm. The precipitate thus obtained was filtered on a filter paper, rinsed with water until little constant residual foaming of the washing water and a negative silver nitrate test of the washing water were obtained. The precipitate thus washed was dried at a reduced pressure in nitrogen at 60° C. for 3 to 4 days, after which 212 g of dry masterbatch were thus recovered.

III-1-C. Preparation of the Rubber Compositions

The control composition (with HDS silica filler) was conventionally prepared as follows: the SBR elastomer pre-extended with 37.5 phr of an aromatic oil, and also part of the filler, were firstly introduced (the "non-productive step") into an internal mixer, the initial chamber temperature of which was about 90° C. After an appropriate mixing time, of the order of 1 minute, the coupling agent and the remaining part of the filler were added. The other ingredients, with the exception of the vulcanization system, were added after 2 minutes. The internal mixer was then 75% full. The mixture then underwent thermomechanical working for a time of about 6 minutes, with an average speed of the blades of 70 rpm, until a drop temperature of about 135° C. was obtained.

The procedure for the composition according to the invention (with a PVAr filler) was carried out in the identical manner, except that the polymeric filler and the diene elastomer were introduced in one go right at the start, in the form of the masterbatch prepared beforehand, containing 39 phr PVAr particles; then the oil extender was gradually incorporated.

After the thermomechanical mixing work, the compound obtained was recovered, cooled and then the vulcanization system (sulfenamide-type primary accelerator and sulfur) was added to it on an external mixer at 30° C., all the ingredients being mixed (in the "productive step") for a suitable time (between 5 and 12 minutes).

The compositions thus obtained were then either calendared in the form of rubber sheets (2 to 3 mm in thickness), for measuring their mechanical properties, or extruded in the form of a semi-finished product for a tire, for example a tread. The vulcanization (curing) was carried out under pressure at 150° C. for 40 minutes.

Figure 2:
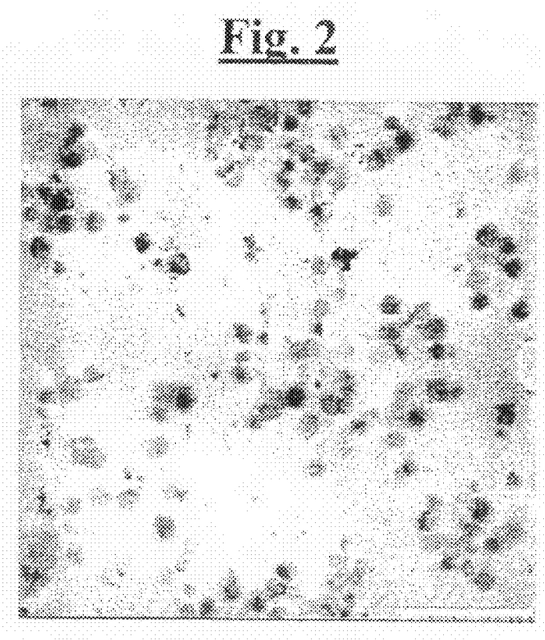

The TEM micrograph (produced as indicated in section I-1-B) shown in FIG. 2 was that obtained on the composition of the invention. It shows that the PVAr filler is in the form of spherical elementary particles (nanobeads) assembled in aggregates uniformly dispersed in the elastomeric phase.

III-1-D. Comparative Rubber Test

The object of this test was to compare the performance of the PVAr filler to that of the conventional inorganic filler (HDS silica).

To do this, two compositions, the general formulation of which was conventional in the case of high-performance tire treads, combining low running resistance and high wear resistance (low-energy-consumption automobile tires called "green tires"), were compared. The HDS silica chosen for reinforcing the control composition was a tire-grade silica having, in a known manner, a very high reinforcing power (Zeosil 1165 MP from Rhodia, with a density of about 2.1 g/cm$^3$).

For the control composition, the diene elastomer used was SBR, the synthesis of which was described in the above section III-1-B, extended beforehand with 37.5% of an aromatic oil (i.e. 37.5 phr of oil per 100 phr of dry SBR).

The two compositions tested were strictly identical apart from the nature of the reinforcing filler:

composition C-1: HDS silica (control);

composition C-2: MTSP-functionalized PVAr.

The reinforcing filler content was adjusted to iso-volume fraction of filler (the same volume, i.e. 19%, of filler in each composition). Since the specific surface area of the polymeric filler was lower, the amount of TESPT coupling agent introduced into composition C-2 was therefore smaller.

In composition C-2 of the invention, the PVAr filler represented about 97% (by volume) of the entire content of reinforcing filler, this including a small portion (2 phr) of carbon black.

Figure 3:
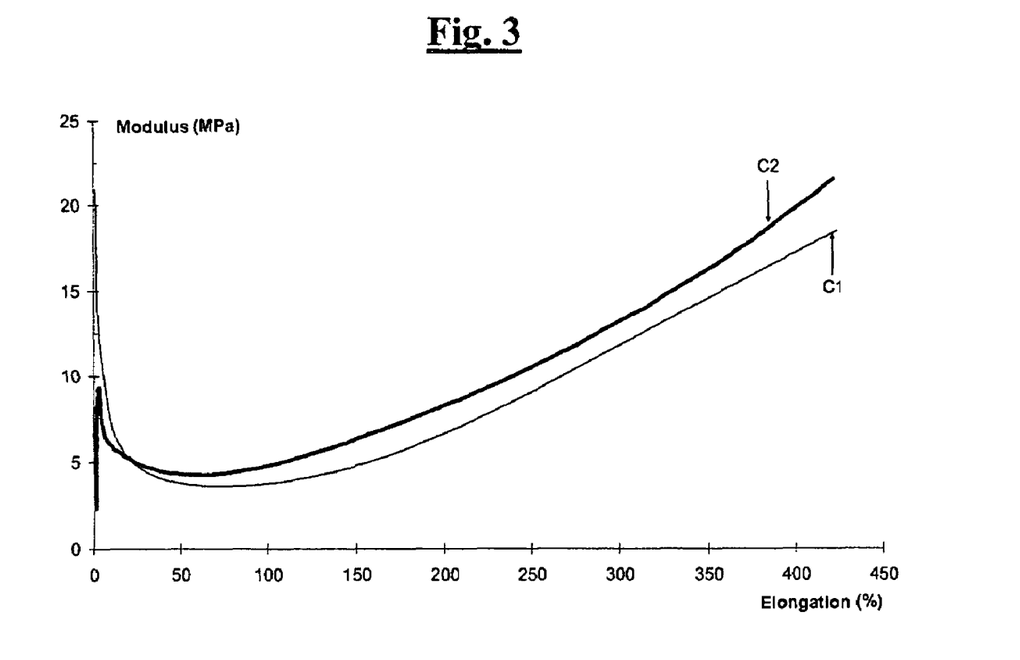

Tables 1 and 2 give in succession the formulation of the various compositions (Table 1: content of the various ingredients expressed in phr) and their properties before and after curing at 150° C. for 40 min (Table 2). FIG. 3 reproduces the curves of the true secant modulus (in MPa) as a function of the elongation (in %). These curves are labeled C1 and C2 and correspond to rubber compositions C-1 and C-2 respectively.

Examination of the various results in Table 2 shows, for the composition C-2 according to the invention, compared with the control composition C-1:
- in the uncured state, the scorch safety time ($T_i$) and the rate of vulcanization (constant K) are slightly improved;
- a very substantial reduction in the density (measured using a helium pycnometer) of about 16% compared with the control composition (the difference being maintained, of course, after curing);
- after curing, higher modulus values at high strain (M300 and M400), a clear indicator to a person skilled in the art of a very high level of reinforcement, at least equal to, if not greater than, that provided by the HDS control silica; and
- finally, something which is not insignificant, hysteresis properties which, unexpectedly, are very substantially improved, as illustrated by a large reduction in the tan $δ_{max}$ and $ΔG^*$ values. This is a recognized indicator of reduced running resistance and reduced heat-up.

The appended FIG. 3 clearly confirms the above results: it should be noted that curve C2 lies appreciably above curve C1, the difference becoming more pronounced when the elongation increases. This illustrates a high level of reinforcement, at least equal to that provided by the HDS silica, in other words a high quality of bonding or coupling between the functionalized PVAr and the diene elastomer.

III-2. Test 2

In the following exemplary embodiments, three functionalized and crosslinked PVAr polymeric fillers (denoted by filler A, filler B and filler C respectively) were synthesized by radical polymerization of the four different monomers:
- filler A: styrene, EVB, DVB and MTSP (trimethoxysilylpropyl methacrylate);
- filler B: styrene, EVB, DVB and TSES (styrylethyltrimethoxysilane); and
- filler C: styrene, EVB, DVB and HEMA (hydroxyethyl methacrylate).

Only fillers A and B therefore carried a functional group Z of formula ≡Si—X (X representing a hydroxyl or hydrolyzable group) and were therefore suitable for compositions of the invention.

It will be recalled that hydroxyethyl methacrylate (HEMA) has the following formula:

This monomer was used in particular as functionalizing comonomer in the synthesis of certain polymeric fillers as described, for example, in the patent documents EP-A-1 063 259 or U.S. Pat. No. 6,399,706.

As previously in Test 1, to be tested and compared, these three fillers were then incorporated into rubber compositions in the form of a masterbatch obtained by coprecipitating a latex of the PVAr filler and a latex of a diene elastomer (SBR).

III-2-A. Synthesis of the PVAr Fillers

The radical emulsion polymerization was carried out in a medium buffered to pH 7, with simultaneous introduction, into a reactor, of styrene, depending on the intended functionalization, of MTSP (filler A), of TSES (filler B) or of HEMA (filler C), and of a DVB/EVB blend (a DVB product from Fluka containing in fact 50% DVB and 50% EVB isomers). Said blend was washed beforehand three times with an aqueous 1M sodium hydroxide solution (3×165 ml per 200 ml of DVB/EVB blend) and then washed with water until a neutral pH was obtained.

The various monomers were subjected beforehand to nitrogen sparging, as were the aqueous solutions used, with the exception of the SDS solution (sparging in the powder state). The HEMA was distilled beforehand. The reaction was carried out in a 1.5-liter reactor fitted with mechanical stirring and with a condenser. After introducing 845 ml of water, or 773 ml of water in the case of TSES, and nitrogen sparging for 30 min with stirring, 50 ml of an aqueous 0.9 mol/l SDS solution and 50 ml of an equimolar 1 mol/l buffer solution of sodium hydrogen phosphate and ammonium dihydrogen phosphate were introduced in succession.

The monomer fillers were added to this solution buffered to pH 7 gently stirred at 150 rpm and heated at 60° C., as follows:
- filler A: consisting of 36.4 g of styrene (i.e. a weight fraction of 37%), 24.8 g of MTSP (weight fraction of 25%), 18.7 g of DVB (weight fraction of 19%) and 18.7 g of EVB (weight fraction of 19%), giving a total of 98.6 g of monomers;
- filler B: consisting of 36.4 g of styrene (i.e. a weight fraction of 36%), 26.9 g of TSES (weight fraction of 26.7%), 18.7 g of DVB (weight fraction of 18.6%) and 18.7 g of EVB (weight fraction of 18.6%), giving a total of 100.7 g of monomers; and
- filler C: consisting of 36.4 g of styrene (i.e. a weight fraction of 42%), 13.1 g of HEMA (weight fraction of 15.1%), 18.7 g of DVB (weight fraction of 21.5%) and 18.7 g of EVB (weight fraction of 21.5%), giving a total of 86.9 g of monomers.

Next, 36 ml of an aqueous (0.125 mol/l) potassium persulfate solution were added to the resulting emulsion, with vigorous stirring (350 rpm). Since the TSES was stabilized with TBC (4-tert-butylcatechol), the amount of solution introduced in the case of the latter was 108 ml. After stirring for 2 h 45 min at 60° C., 18 ml of an aqueous (0.5 mol/l) hydroquinone solution were added to the polymerization medium. The reaction medium was cooled before it was mixed with the elastomer (conversion, measured by solids content, was 95%).

The functionalized and crosslinked PVAr fillers thus obtained were in the form of a latex comprising about 10% by weight of polymer, the balance (about 90%) being water. The assay of the silicon content on fillers A and B, carried out as indicated previously in Test 1, clearly confirmed the fucntionalization provided by the MTSP and TSES monomers (silicon content of about 2.7 to 2.9%). For these fillers A and B, the NMR analysis clearly confirmed the presence of a predominant feature between −41 ppm and −38 ppm, characteristic of silicon of Si—X type.

III-2-B. Preparation of the Masterbatch

As soon as the filler latices had been synthesized, they were cooled to room temperature and then added, each time, to the SBR latex (diluted to 216.6 g/l) prepared as indicated previously in Test 1 (section III-1-B), in order to obtain a masterbatch. As previously, the intended PVAr filler content in the masterbatch, as in the final rubber composition, was 39 phr.

III-2-C. Preparation of the Rubber Compositions

The polymeric filler and the diene elastomer, in the form of the masterbatch prepared beforehand, comprising 39 phr of PVAr particles, were firstly introduced, in one go ("nonproductive step"), into an internal mixer, the initial chamber temperature of which was about 90° C. After mixing for an appropriate time, of the order of 1 minute, the coupling agent was added and then the oil extender was gradually incorporated. The other ingredients, with the exception of the vulcanization system, were added after 2 minutes. The internal mixer was then 75% full. The mixture then underwent thermomechanical working for a time of about 6 minutes, with an average speed of the blades of 70 rpm, until a drop temperature of about 135° C. was obtained.

After the thermomechanical mixing work, the mixture obtained was recovered, cooled and then the vulcanization system (sulfenamide-type primary accelerator and sulfur) was added on an external mixer at 30° C., all the ingredients being mixed ("productive step") for an appropriate time (between 5 and 12 minutes). The compositions thus obtained were either calendared in the form of rubber sheets (with a thickness of 2 to 3 mm), for measuring their mechanical properties, or extruded in the form of a semi-finished product for a tire, for example a tread. The vulcanization (curing) was carried out under pressure at 150° C. for 40 minutes.

III-2-D. Comparative Rubber Test

The purpose of this test was to compare the performance of the two compositions according to the invention (denoted by C-3 and C-4 respectively), incorporating fillers A and B, with the composition not according to the invention (denoted by C-5) incorporating the control filler C. The three compositions were for example intended for tire treads.

Figure 4:
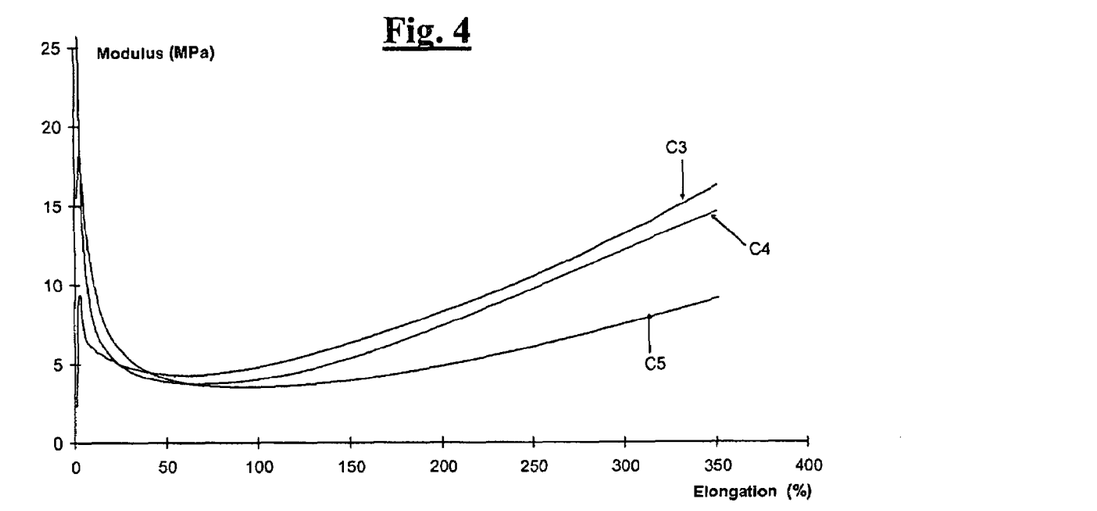

Tables 3 and 4 give in succession the formulation of the various compositions (Table 3: contents of the various ingredients expressed in phr) and their properties before and after curing at 150° C. for 40 minutes (Table 4). In the three compositions, the functionalized PVAr filler represents about 97% (by volume) of all the reinforcing filler, the latter furthermore including a very small proportion (2 phr) of carbon black. FIG. 4 reproduces the curves of the true secant modulus (in MPa) as a function of the elongation (in %). These curves are denoted by C3, C4 and C5 and correspond to rubber compositions C-3, C-4 and C-5 respectively.

Examination of the results in Table 4 show, for the two compositions C-3 and C-4 according to the invention, compared with composition C-5 not according to the invention:

an identical density;

after curing, markedly higher high-strain modulus values (M100 and M300), a clear indicator of a greater level of reinforcement provided by fillers A and B. Appended FIG. 4 clearly confirms the above results, curves C3 and C4 being well above curve C5, with a difference that increases as the elongation increases; and finally, and above all, hysteresis values (illustrated by tan $\delta_{max}$ and $\Delta G^*$) which are maintained at the remarkably low level of composition C-1 above and very much below the values observed in composition C-5. This presages a rolling resistance and a heat built-up that are substantially reduced thanks to the use of polymeric fillers A and B.

III-3. Test 3

In this test, a new Z-functionalized and crosslinked PVAr filler was synthesized as described above in Test 1, but on a larger scale. It was then incorporated, in the form of a masterbatch, into a rubber composition according to the invention, which was finally compared with a control rubber composition conventionally filled with HDS silica.

III-3-A. Synthesis of the PVAr Filler

As in the previous tests, the radical emulsion polymerization was carried out in a buffered medium (pH equal to 7) with simultaneous introduction, into a reactor, of styrene, MTSP (Aldrich product) and a DVB/EVB blend (DVB product from Fluka), said blend having been washed beforehand three times with a 1M aqueous sodium hydroxide solution and then washed with water until a neutral pH was obtained.

The various monomers were subjected beforehand to nitrogen sparging, as were the aqueous solutions used, with the exception of the SDS solution (sparging in the powder state). The reaction was carried out in a 30-liter reactor fitted with mechanical stirring. After introducing 16.3 l of water and sparging with nitrogen for 30 minutes with stirring, the temperature was raised to 60° C. Next, 965 ml of an aqueous 0.9 mol/l SDS solution and 965 ml of an equimolar 1 mol/l buffer solution of sodium hydrogen phosphate and ammonium dihydrogen phosphate were introduced in succession. Added to this solution, buffered to pH 7, gently stirred at 150 rpm and heated to 60° C., was the monomer filler composed of 701 g of styrene (i.e. a weight fraction of 37%), 478 g of MTSP (weight fraction of 25%), 361.5 g of DVB (weight fraction of 19%) and 361.5 g of EVB (weight fraction of 19%), giving a total of 1902 g of monomers.

Next, 695 ml of an aqueous potassium persulfate (0.125 mol/l) solution were added to the resulting emulsion, with vigorous stirring (350 rpm). After stirring for 2 h 45 min at 60° C., 345 ml of an aqueous hydroquinone (0.5 mol/l) solution were added to the polymerization mixture. The reaction medium was cooled and diluted with 42 l of water before being mixed with the elastomer latex, i.e. 63.3 l of 28.5 g/l Z-functionalized PVAr filler latex (1807 g of filler).

The physicochemical characteristics of the filler latex thus prepared were substantially the same as those found for the product synthesized on a smaller scale (Test 1). In particular, analysis showed that the nanoparticles (elementary particles) were in the form of nanobeads having predominantly a diameter between 20 and 60 nm (average circular diameter about 30 nm). The density of the filler, measured on powder, was 1.1 g/cm$^3$.

III-3-B. Preparation of the Masterbatch

The PVAr filler latex, diluted and cooled to room temperature, was then added to an SBR latex (21.5 l of 216 g/l SBR latex) in order to achieve a filler concentration of 39 phr. The resulting mixture was gently homogenized. At this stage, an antioxidant was able in particular to be added (dissolved for example in an appropriate solvent such as toluene), for example in the form of an aqueous emulsion. The mixture was then added, at a rate of 2 l/min, to 168 l of vigorously stirred methanol, in order to precipitate the masterbatch. The precipitate thus obtained was filtered and rinsed with water until little constant residual foaming of the washing water and a negative silver nitrate test of the washing water were obtained. The masterbatch thus washed was dried under reduced pressure in nitrogen at 60° C., for 2 days.

III-3-C. Rubber Tests

Two rubber compositions denoted C-6 and C-7 were then prepared, as indicated above in the case of Test 1. The two compositions tested were strictly identical except for the nature of the reinforcing filler:

composition C-6: HDS silica (control);

composition C-7: MTSP-functionalized PVAr.

The reinforcing filler content was adjusted to iso-volume fraction of filler (the same volume, i.e. about 19%, of filler in each composition). Thanks to the low density of the organic filler, the density of composition C-7 was significantly reduced (1.01 g/cm$^3$ instead of 1.19 g/cm$^3$). Since the specific surface area of the polymeric filler was low, the amount of TESPT coupling agent introduced into composition C-7 was therefore lower.

Tables 5 and 6 give, in succession, the formulation of the various compositions (Table 5: contents of the various ingredients expressed in phr) and their properties after curing at 150° C. for 40 minutes (Table 6).

Examination of the results in Table 6 shows, for the composition C-7 according to the invention, compared, after curing, with the control composition C-6:
- higher high-strain modulus (M300, M400) values, a clear indicator of a very high level of reinforcement, at least equal to if not greater than that provided by the HDS silica as control;
- very substantially improved hysteresis properties (great reduction in the tan $\delta_{max}$ and $\Delta G^*$ values). This substantially confirms the unexpected results already observed in Tests 1 and 2 above.

Two compositions similar to compositions C-6 and C-7 above (formulated with a TDAE oil instead of the aromatic oil) were compared as treads within the context of an actual running test on passenger vehicles tires. Compared with the control composition, the composition according to the invention revealed quite an appreciable reduction (improvement) of 9.5% in the rolling resistance, thus confirming the appreciable hysteresis gains observed at the laboratory stage. Furthermore, and also quite unexpectedly, an increase (improvement) of 13% in the wear resistance of the tread of the invention was observed.

III-4. Test 4

In this new test, a PVAr filler synthesized as indicated above in Test 2 (30-liter reactor) was incorporated into a rubber composition in the form of a masterbatch obtained by coprecipitating a PVAr filler latex and a natural rubber (NR) latex. Said composition according to the invention was finally compared with a control rubber composition based on NR and conventionally filled with HDS silica.

III-4-A. Preparation of the Masterbatch

The PVAr filler latex was incorporated into natural rubber in order to obtain a masterbatch. The intended PVAr filler content in the masterbatch, as in the final rubber composition, was 39 phr. The solids content of the NR latex was determined by weighing, on the dry extract. Before preparing the masterbatch, the NR latex was diluted with water to an NR content of 200 g/l.

The PVAr filler latex diluted and cooled to room temperature was added to the diluted NR latex in an amount of 39 phr of filler (i.e. 23 l of 200 g/l NR latex). Next, 64 g of antioxidant (N-(1,3-dimethylbutyl)-N'-phenyl-p-phenylenediamine) were added in the form of an aqueous emulsion and the resulting mixture was gently homogenized. This mixture was then added at a rate of 2 l/min to 168 l of vigorously stirred methanol, in order to precipitate the masterbatch.

The precipitate thus obtained was filtered and rinsed with water, and then the methanol was removed by steam distillation. The masterbatch was then washed with water to remove the surfactant and buffer salts by several cycles of successive dilution and settling operations until a little constant residual foaming of the washing water and a negative silver nitrate test of the washing water were obtained. The masterbatch thus washed was filtered and then dried under reduced pressure (in nitrogen) at 60° C. for 2 days.

III-4-B. Rubber Tests

Two NR rubber compositions were then prepared as indicated above in the case of Test 1 (top temperature about 145° C.), these two compositions differing only by the nature of their reinforcing filler, as follows:
- composition C-8 (control): HDS silica;
- composition C-9 (invention): MTSP-functionalized PVAr.

As preferential application examples, such rubber compositions are typically used in parts of ground-contacting systems, particularly tires, normally using NR-based rubber matrixes, such as for example the internal safety supports for tires, the sidewalls, the tire bead zones, the tread sublayers, and also the treads for these tires, especially for heavy-goods vehicles.

The content of reinforcing filler was adjusted to iso-volume fraction of filler (same volume, i.e. about 17%, of filler in each composition). Since the specific surface area of the polymeric filler was lower, the amount of TESPT coupling agent introduced into composition C-9 was therefore appreciably lower. In composition C-9 of the invention, the PVAr filler represents about 97% (by volume) of all the reinforcing filler, the latter including a small proportion (1 phr) of carbon black.

Figure 5:
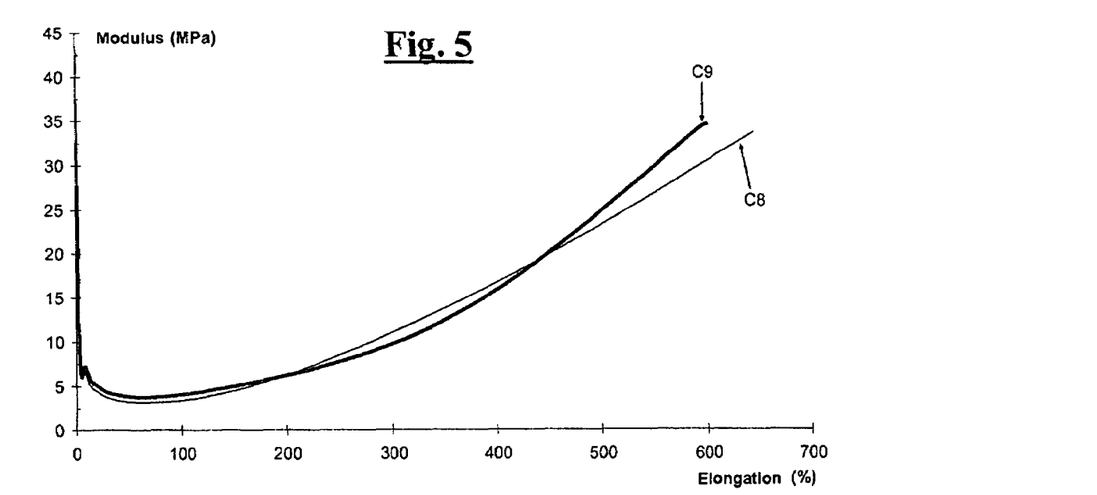

Tables 7 and 8 give, in succession, the formulation of the various compositions (Table 7: content of the various ingredients expressed in phr) and their properties before and after curing at 150° C. for 30 minutes (Table 8). FIG. 5 reproduces the curves of the true secant modulus (in MPa) as a function of the elongation (in %). These curves are denoted by C8 and C9 and correspond to compositions C-8 and C-9 respectively.

Examination of the various results in Table 8 shows, for the composition C-9 according to the invention, compared with the control composition C-8:
- in the uncured state, similar or even improved scorch safety time ($T_i$) and vulcanization rate (constant K);
- a very substantial reduction in density (about −14%);
- after curing, higher very-high-strain modulus values (see the M600 values). Appended FIG. 5 clearly confirms the above results, which shows that curve C9 lies well above curve C8 for the highest strains, the difference between the two curves increasing as the elongation increases. This illustrates a high level of reinforcement provided by the PVAr filler, at least equal to if not greater than that provided by the HDS silica as control; and
- finally and above all, and this clearly confirms all the above results observed with a synthetic diene elastomer (SBR), hysteresis properties this time are again greatly improved (very substantially reduced tan $\delta_{max}$ and $\Delta G^*$ values).

In conclusion, the specific polymeric filler of the compositions according to the invention, thanks to its very greatly reduced density compared with a conventional reinforcing filler such as carbon black or HDS silica, makes it possible for the weight of said compositions to be very substantially reduced.

This objective is achieved not only without degrading the reinforcement, synonymous with wear resistance or crack resistance, compared with these conventional fillers, but also by allowing an appreciable reduction in hysteresis to be achieved, synonymous with rolling resistance or heat-up, further improved relative to a conventional inorganic reinforcing filler such as an HDS silica.

Finally, one remarkable advantage of the PVAr filler should be emphasized: since the density of the composition of the invention becomes substantially equal to that of the polymeric filler itself, it thus becomes possible to increase the reinforcing filler content without increasing the density of the rubber matrix.

TABLE 1

| | Composition No.: | |
|---|---|---|
| | C-1 | C-2 |
| SBR (1) | 100 | 100 |
| HDS silica (2) | 77 | — |
| PVAr filler (3) | — | 39 |
| Coupling agent (4) | 6.2 | 1.8 |
| Carbon black (N234) | 2 | 2 |
| Aromatic oil (5) | 37.5 | 37.5 |
| ZnO | 2.5 | 2.5 |
| Stearic acid | 2 | 2 |
| Antioxidant (6) | 1.9 | 1.9 |
| Sulfur | 1.5 | 1.5 |
| Accelerator (7) | 2.5 | 2.5 |

(1) SBR (synthesis described in section III-1-B);
(2) HDS silica (Zeosil 1165MP from Rhodia);
(3) MTSP-functionalized PVAr (synthesis according to section III-1);
(4) TESPT (Si69 from Degussa);
(5) Aromatic oil (Exarol MX 140 from Total);
(6) N-1,3-dimethylbutyl-N-phenylparaphenylenediamine (Santoflex 6-PPD from Flexsys);
(7) N-cyclohexyl-2-benzothiazylsulfenamide (Santocure CBS from Flexsys).

TABLE 2

| | Composition No.: | |
|---|---|---|
| | C-1 | C-2 |
| Properties before curing: | | |
| $T_i$ (min) | 8 | 12 |
| K (min$^{-1}$) | 0.136 | 0.157 |
| Density (g/cm$^3$) | 1.19 | 1.01 |
| Properties after curing: | | |
| M100 (MPa) | 3.7 | 4.8 |
| M300 (MPa) | 11.8 | 13.2 |
| M400 (MPa) | 17.2 | 19.8 |
| Tensile strength (MPa) | 23.3 | 22.0 |
| Elongation at break (%) | 601 | 484 |
| ΔG* | 6.2 | 1.6 |
| tanδ$_{max}$ | 0.330 | 0.199 |

TABLE 3

| | Composition No.: | | |
|---|---|---|---|
| | C-3 | C-4 | C-5 |
| SBR (1) | 100 | 100 | 100 |
| PVAr filler (2) | 39 | — | — |
| PVAr filler (3) | — | 39 | — |
| PVAr filler (4) | — | — | 39 |
| Coupling agent (5) | 1.8 | 1.8 | 1.8 |
| Carbon black (N234) | 2 | 2 | 2 |
| Aromatic oil (6) | 37.5 | 37.5 | 37.5 |
| ZnO | 2.5 | 2.5 | 2.5 |
| Stearic acid | 2 | 2 | 2 |
| Antioxidant (7) | 1.9 | 1.9 | 1.9 |
| Sulfur | 1.5 | 1.5 | 1.5 |
| Accelerator (8) | 2.5 | 2.5 | 2.5 |

(1) SBR (synthesis described in section III-1-B);
(2) Filler A (MTSP-functionalized PVAr);
(3) Filler B (TSES-functionalized PVAr);
(4) Filler C (HEMA-functionalized PVAr);
(5) TESPT (Si69 from Degussa);
(6) Aromatic oil (Exarol MX 140 from Total);
(7) N-1,3-dimethylbutyl-N-phenylparaphenylenediamine (Santoflex 6-PPD from Flexsys);
(8) N-cyclohexyl-2-benzothiazylsulfenamide (Santocure CBS from Flexsys).

TABLE 4

| | Composition No.: | | |
|---|---|---|---|
| | C-3 | C-4 | C-5 |
| Density (g/cm$^3$) | 1.01 | 1.01 | 1.01 |
| Properties after curing: | | | |
| M100 (MPa) | 4.8 | 4.0 | 3.5 |
| M300 (MPa) | 13.2 | 12.2 | 7.5 |
| ΔG* | 1.6 | 1.2 | 4.3 |
| tanδ$_{max}$ | 0.199 | 0.197 | 0.291 |

TABLE 5

| | Composition No.: | |
|---|---|---|
| | C-6 | C-7 |
| SBR (1) | 100 | 100 |
| HDS silica (2) | 77 | — |
| PVAr filler (3) | — | 39 |
| Coupling agent (4) | 6.2 | 1.8 |
| Carbon black (N234) | 2 | 2 |
| Aromatic oil (5) | 37.5 | 37.5 |
| ZnO | 2.5 | 2.5 |
| Stearic acid | 2 | 2 |
| Antioxidant (6) | 1.9 | 1.9 |
| Sulfur | 1.5 | 1.5 |
| Accelerator (7) | 2.5 | 2.5 |

(1) SBR (synthesis described in section III-1-B);
(2) HDS silica (Zeosil 1165MP from Rhodia);
(3) MTSP-functionalized PVAr
(4) TESPT (Si69 from Degussa);
(5) Aromatic oil (Exarol MX 140 from Total);
(6) N-1,3-dimethylbutyl-N-phenylparaphenylenediaminen (Santoflex 6-PPD from Flexsys);
(7) N-cyclohexyl-2-benzothiazylsulfenamide (Santocure CBS from Flexsys).

TABLE 6

| | Composition No.: | |
|---|---|---|
| Properties after curing: | C-6 | C-7 |
| M100 (MPa) | 3.5 | 4.0 |
| M300 (MPa) | 11.3 | 12.9 |
| M400 (MPa) | 17.2 | 17.7 |
| Tensile strength (MPa) | 15.1 | 14.4 |
| Elongation at break (%) | 426 | 406 |
| ΔG* | 5.1 | 1.0 |
| tanδ$_{max}$ | 0.326 | 0.197 |

TABLE 7

| | Composition No.: | |
|---|---|---|
| | C-8 | C-9 |
| NR (1) | 100 | 100 |
| HDS silica (2) | 50 | — |
| PVAr filler (3) | — | 25.7 |
| Carbon black (N234) | 1 | 1 |
| Coupling agent (4) | 4 | 1.16 |
| ZnO | 3 | 3 |
| Stearic acid | 2.5 | 2.5 |

TABLE 7-continued

| | Composition No.: | |
|---|---|---|
| | C-8 | C-9 |
| Antioxidant (5) | 2.0 | 2.0 |
| Sulfur | 1.5 | 1.5 |
| Accelerator (6) | 1.8 | 1.8 |

(1) Natural rubber;
(2) HDS silica (Zeosil 1165MP from Rhodia);
(3) MTSP-functionalized PVAr;
(4) TESPT (Si69 from Degussa);
(5) N-1,3-dimethylbutyl-N-phenylparaphenylenediamine (Santoflex 6-PPD from Flexsys);
(6) N-cyclohexyl-2-benzothiazylsulfenamide (Santocure CBS from Flexsys).

TABLE 8

| | Composition No.: | |
|---|---|---|
| | C-8 | C-9 |
| Properties before curing: | | |
| $T_i$ (min) | 9 | 10 |
| K (min$^{-1}$) | 0.307 | 0.381 |
| Density (g/cm$^3$) | 1.15 | 0.99 |
| Properties after curing: | | |
| M100 (MPa) | 3.4 | 4.1 |
| M300 (MPa) | 11.1 | 9.8 |
| M400 (MPa) | 16.7 | 15.8 |
| M600 (MPa) | 30.4 | 34.6 |
| Tensile strength (MPa) | 29.2 | 29.6 |
| Elongation at break (%) | 644 | 600 |
| ΔG* | 1.92 | 0.83 |
| tanδ$_{max}$ | 0.198 | 0.114 |

The invention claimed is:

1. A rubber composition based on at least a diene elastomer, a polymeric filler and a coupling agent for bonding between the polymeric filler and the elastomer, wherein said polymeric filler comprises nanoparticles of a polyvinylaromatic carrying a functional group denoted by Z of formula ≡Si—X, X representing a hydroxyl or hydrolyzable group.

2. The composition according to claim 1, the polyvinylaromatic being a vinylaromatic homopolymer or a copolymer at least the predominant fraction by weight of which is vinylaromatic.

3. The composition according to claim 2, the polyvinylaromatic being a styrene homopolymer or copolymer.

4. The composition according to claim 1, X being a halogen.

5. The composition according to claim 4, X being chlorine.

6. The composition according to claim 1, X satisfying the formula OR in which R is selected from the group consisting of hydrogen, alkyls, alkoxyalkyls, cycloalkyls and aryls containing 1 to 15 carbon atoms.

7. The composition according to claim 6, R being selected from the group consisting of hydrogen, $C_1$-$C_8$ alkyls, $C_2$-$C_8$ alkoxyalkyls, $C_5$-$C_{10}$ cycloalkyls and $C_6$-$C_{12}$ aryls.

8. The composition according to claim 7, Z satisfying one of the formulae:

in which:
the radicals $R^1$, which are substituted or unsubstituted, identical or different, are selected from the group consisting of $C_1$-$C_8$ alkyls, $C_5$-$C_8$ cycloalkyls and $C_6$-$C_{12}$ aryls; and
the radicals $R^2$, which are substituted or unsubstituted, identical or different, are selected from the group consisting of hydroxyl, $C_1$-$C_8$ alkoxyls and $C_5$-$C_8$ cycloalkoxyls.

9. The composition according to claim 8, the radicals $R^1$ being selected from the group consisting of $C_1$-$C_4$ alkyls, cyclohexyl and phenyl.

10. The composition according to claim 9, the radical $R^1$ being selected from the group consisting of $C_1$-$C_4$ alkyls.

11. The composition according to claim 8, the radicals $R^2$ being selected from the group consisting of hydroxyl and $C_1$-$C_6$ alkoxyls.

12. The composition according to claim 11, the radicals $R^2$ being selected from the group consisting of hydroxyl and $C_1$-$C_4$ alkoxyls.

13. The composition according to claim 8, the radicals $R^1$ being selected from the group consisting of methyl and ethyl, and the radicals $R^2$ being selected from the group consisting of hydroxyl, methoxyl and ethoxyl.

14. The composition according to claim 1, the polyvinylaromatic being a copolymer of, on the one hand, at least a vinylaromatic first comonomer (denoted comonomer A) and, on the other hand, at least a functionalized second comonomer carrying the functional group Z of formula ≡Si—X (denoted comonomer B).

15. The composition according to claim 14, comonomer A being a styrene compound.

16. The composition according to claim 15, the styrene compound being selected from the group consisting of styrene, ethylvinylbenzene, divinylbenzene and mixtures of such monomers.

17. The composition according to claim 14, comonomer B being selected from the group consisting of hydroxysilyl($C_1$-$C_4$)alkyl acrylates and methacrylates, ($C_1$-$C_4$)alkoxysilyl ($C_1$-$C_4$)alkyl acrylates and methacrylates and mixtures of such monomers.

18. The composition according to claim 17, comonomer B being selected from the group consisting of hydroxysilyl($C_1$-$C_4$)alkyl acrylates and methacrylates, methoxysilyl($C_1$-$C_4$) alkyl acrylates and methacrylates, ethoxysilyl($C_1$-$C_4$)alkyl acrylates and methacrylates and mixtures of such monomers.

19. The composition according to claim 18, comonomer B being selected from the group consisting of hydroxysilylpropyl acrylates and methacrylates, methoxysilylpropyl acrylates and methacrylates, ethoxysilylpropyl acrylates and methacrylates, and mixtures of such monomers.

20. The composition according to claim 19, comonomer B being trimethoxysilylpropyl acrylate or trimethoxysilylpropyl methacrylate.

21. The composition according to claim 14, comonomer B being selected from the group consisting of styryl($C_1$-$C_4$) alkylhydroxysilanes, styryl($C_1$-$C_4$)alkyl($C_1$-$C_4$)alkoxysilanes and mixtures of such monomers.

22. The composition according to claim 21, comonomer B being selected from the group consisting of styryl($C_1$-$C_4$) alkylhydroxysilanes, styryl($C_1$-$C_4$)alkylmethoxysilanes, styryl($C_1$-$C_4$)alkylethoxysilanes and mixtures of such monomers.

23. The composition according to claim 22, comonomer B being selected from the group consisting of styrylethylhydroxysilanes, styrylethylmethoxysilanes, styrylethylethoxysilanes and mixtures of such monomers.

24. The composition according to claim 23, comonomer B being styrylethyltrimethoxysilane.

25. The composition according to claim 14, the molar content of comonomer B in said vinylaromatic copolymer being greater than 5%.

26. The composition according to claim 25, the molar content of comonomer B in said vinylaromatic copolymer being between 5 and 30%.

27. The composition according to claim 26, the molar content of comonomer B in said vinylaromatic copolymer being between 5 and 20%.

28. The composition according to claim 1, the polyvinylaromatic being furthermore crosslinked by the presence of at least one at least difunctional crosslinking comonomer (called comonomer C).

29. The composition according to claim 28, comonomer C carrying at least two polymerizable unsaturated groups.

30. The composition according to claim 29, the polymerizable unsaturated groups being ethylenic groups.

31. The composition according to claim 1, the polyvinylaromatic being obtained by radical polymerization.

32. The composition according to claim 28, comonomer C being selected from the group consisting of di(meth)acrylates of polyols, alkylene di(meth)acrylamides, vinylaromatic compounds carrying at least two vinyl groups, and mixtures of such comonomers.

33. The composition according to claim 32, comonomer C being a styrene compound.

34. The composition according to claim 33, the styrene compound being selected from the group consisting of diisopropenylbenzene, divinylbenzene, trivinylbenzene and mixtures of these comonomers.

35. The composition according to claim 28, the weight content of comonomer C in said polyvinylaromatic being greater than 5%.

36. The composition according to claim 35, the weight content of comonomer C in said polyvinylaromatic being between 5 and 30%.

37. The composition according to claim 34, comonomer C being divinylbenzene.

38. The composition according to claim 37, the polyvinylaromatic being a copolymer of styrene, ethylvinylbenzene, divinylbenzene and trimethoxysilylpropylmethacrylate or trimethoxysilylpropylacrylate.

39. The composition according to claim 38, the weight content of trimethoxysilylpropylmethacrylate or trimethoxysilylpropylacrylate being between 10 and 30%.

40. The composition according to claim 39, the weight content of trimethoxysilylpropylmethacrylate or trimethoxysilylpropylacrylate being between 20 and 30%.

41. The composition according to claim 1, the mean diameter of the nanoparticles being between 10 and 100 nm.

42. The composition according to claim 41, the mean diameter of the nanoparticles being between 10 and 60 nm.

43. The composition according to claim 42, the mean diameter of the nanoparticles being between 10 and 40 nm.

44. The composition according to claim 1, the diene elastomer being selected from the group consisting of polybutadienes, synthetic polyisoprenes, natural rubber, butadiene-styrene copolymers, butadiene-isoprene copolymers, butadiene-acrylonitrile copolymers, isoprene-styrene copolymers, butadiene-styrene-isoprene copolymers and blends of these elastomers.

45. The composition according to claim 1, the coupling agent being an at least difunctional silane or polysiloxane.

46. The composition according to claim 1, the polymeric filler content being between 10 and 100 phr.

47. The composition according to claim 46, the polymeric filler content being between 10 and 80 phr.

48. The composition according to claim 47, the polymeric filler content being between 20 and 50 phr.

49. A process for obtaining a rubber composition, in which at least one polymeric filler and a coupling agent for bonding between the polymeric filler and the elastomer are incorporated into at least one diene elastomer, and in that these are all thermomechanically mixed, in one or more steps, until a maximum temperature between 110° C. and 190° C. is reached, wherein said polymeric filler comprises nanoparticles of a polyvinylaromatic functionalized with $\equiv$Si—X, X representing a hydroxyl or hydrolyzable group.

50. The process according to claim 49, the polymeric filler being incorporated in the form of a masterbatch of said filler and at least one diene elastomer.

51. A masterbatch based on at least one diene elastomer and a polymeric filler, said polymeric filler comprises nanoparticles of a polyvinylaromatic carrying a functional group denoted by Z of formula $\equiv$Si—X, X representing a hydroxyl or hydrolyzable group.

52. A process for obtaining a masterbatch comprising at least a diene elastomer and a polymeric filler, comprising:
a latex of the diene elastomer and a latex of the polymeric filler are initially obtained;
the latices are intimately mixed;
the mixture thus obtained is precipitated; and
the precipitate thus obtained is then washed and dried,
wherein said polymeric filler comprises nanoparticles of a polyvinylaromatic carrying a functional group denoted by Z of formula $\equiv$Si—X, X representing a hydroxyl or hydrolyzable group.

53. A process for producing a diene elastomer composition, comprising utilizing the masterbatch according to claim 51.

54. A process for manufacturing articles or semi-finished products made of rubber, comprising utilizing the rubber composition according to claim 1.

55. An article or semi-finished product made of rubber comprising a composition according to claim 1.

56. The rubber article or semi-finished product according to claim 55, this article or semi-finished product being selected from the group consisting of tires, internal safety supports for tires, wheels, rubber springs, elastomeric articulations and suspension and antivibration elements.

57. A tire comprising the rubber composition according to claim 1.

58. A semi-finished product for a tire, comprising the rubber composition according to claim 1.

59. The semi-finished product for a tire according to claim 58, said semi-finished product being selected from the group consisting of treads, underlayers for treads, crown reinforcement plies, sidewalls, carcass reinforcement plies, beads, protectors, inner tubes, airtight internal rubber compounds for tubeless tires, internal rubber compounds for reinforcing sidewalls, and rubber compounds intended for supporting the load in the case of running with flat tires.

* * * * *